United States Patent
Lamm et al.

(10) Patent No.: US 12,000,139 B2
(45) Date of Patent: Jun. 4, 2024

(54) INSULATION INJECTION DEVICE

(71) Applicant: Building Envelope Materials LLC, Lexington, MA (US)

(72) Inventors: Douglas W. Lamm, Lexington, MA (US); Alexander C. Bell, Madbury, NH (US)

(73) Assignee: Building Envelope Materials LLC, Lexington, MA (US)

( * ) Notice: Subject to any disclaimer, the term of this patent is extended or adjusted under 35 U.S.C. 154(b) by 493 days.

(21) Appl. No.: 16/848,087

(22) Filed: Apr. 14, 2020

(65) Prior Publication Data

US 2020/0325676 A1 Oct. 15, 2020

Related U.S. Application Data

(60) Provisional application No. 62/833,721, filed on Apr. 14, 2019.

(51) Int. Cl.
| | |
|---|---|
| *E04B 1/76* | (2006.01) |
| *B29C 44/18* | (2006.01) |
| *B29C 44/38* | (2006.01) |
| *B29C 44/44* | (2006.01) |
| *E04F 21/08* | (2006.01) |
| *B29L 31/00* | (2006.01) |
| *B29L 31/10* | (2006.01) |

(52) U.S. Cl.
CPC ............ *E04B 1/7604* (2013.01); *B29C 44/18* (2013.01); *B29C 44/386* (2013.01); *B29C 44/44* (2013.01); *E04F 21/085* (2013.01); *B29L 2031/10* (2013.01); *B29L 2031/776* (2013.01)

(58) Field of Classification Search
CPC ..... E04B 1/7604; B29C 44/18; B29C 44/386; B29C 44/44; B29C 44/367; E04F 21/085; B29L 2031/10; B29L 2031/776; B29K 2075/00
USPC ....................................................... 222/145.7
See application file for complete search history.

(56) References Cited

U.S. PATENT DOCUMENTS

| | | |
|---|---|---|
| 2,564,306 A | 8/1951 | Isreeli |
| 2,750,953 A | 6/1956 | Helsey |
| (Continued) | | |

FOREIGN PATENT DOCUMENTS

| | | |
|---|---|---|
| EP | 1186320 A2 | 3/2002 |
| EP | 2587063 A2 | 1/2013 |

*Primary Examiner* — Vishal Pancholi
(74) *Attorney, Agent, or Firm* — Maine Cernota & Curran

(57) ABSTRACT

A thermal insulation injection gun includes a pointed nozzle that prevents blocking of the nozzle by a distal panel of a building cavity and/or by pre-existing insulation within the cavity. In embodiments, the pointed nozzle can be pressed through a panel, thereby forming the injection hole. An enhancement port can be provided through which an enhancing material such as a carrier fluid, particulate or fibrous insulating material, a binder, or a fire retardant can be added and mixed with the insulating material. Embodiments include expanding nozzle wings that can compress pre-existing insulation to create a space on a proximal or distal side thereof for injecting the insulation. A compressible sheath installed over the nozzle can prevent dripping of excess insulation from the panel hole. Exchangeable collars can be used to fix an insertion depth of the nozzle and/or to block selected lateral dispensing ports of the nozzle.

18 Claims, 17 Drawing Sheets

(56) References Cited

U.S. PATENT DOCUMENTS

| | | | |
|---|---|---|---|
| 2,755,740 | A | 7/1956 | McKean |
| 3,101,673 | A | 8/1963 | Clark |
| 3,213,796 | A | 10/1965 | Cordis |
| 3,462,083 | A | 8/1969 | Kautz |
| 3,529,617 | A | 9/1970 | Huber |
| 3,905,384 | A | 9/1975 | Berger |
| 4,004,602 | A | 1/1977 | Cordis |
| 4,461,454 | A * | 7/1984 | Vadnais ............... B05C 17/002 222/521 |
| 4,490,978 | A | 1/1985 | Hogg |
| 4,789,100 | A | 12/1988 | Senf |
| 5,425,968 | A | 6/1995 | Larson |
| 5,566,866 | A * | 10/1996 | Jacobsen .......... B05C 17/00516 401/266 |
| 5,893,486 | A * | 4/1999 | Wasmire .............. B05C 17/015 366/101 |
| 6,358,344 | B1 | 3/2002 | Hunter, Jr. |
| 6,527,203 | B2 * | 3/2003 | Hurray ................. B29B 7/7438 222/137 |
| 6,659,187 | B1 | 12/2003 | Crabtree |
| 7,347,135 | B2 | 3/2008 | Hogan |
| 9,156,050 | B2 | 10/2015 | McCormick |
| 9,309,663 | B2 | 4/2016 | Fay |
| 9,744,544 | B1 | 8/2017 | Showman |
| 2003/0178446 | A1 * | 9/2003 | Osgood ............ B05C 17/00516 222/327 |
| 2007/0290074 | A9 * | 12/2007 | Dansizen ............. B29B 7/7447 239/433 |
| 2009/0068034 | A1 | 3/2009 | Cook |
| 2016/0107179 | A1 | 4/2016 | McAndrew |
| 2017/0080614 | A1 | 3/2017 | Lamm |
| 2020/0149297 | A1 * | 5/2020 | You ........................ B29C 44/18 |

* cited by examiner

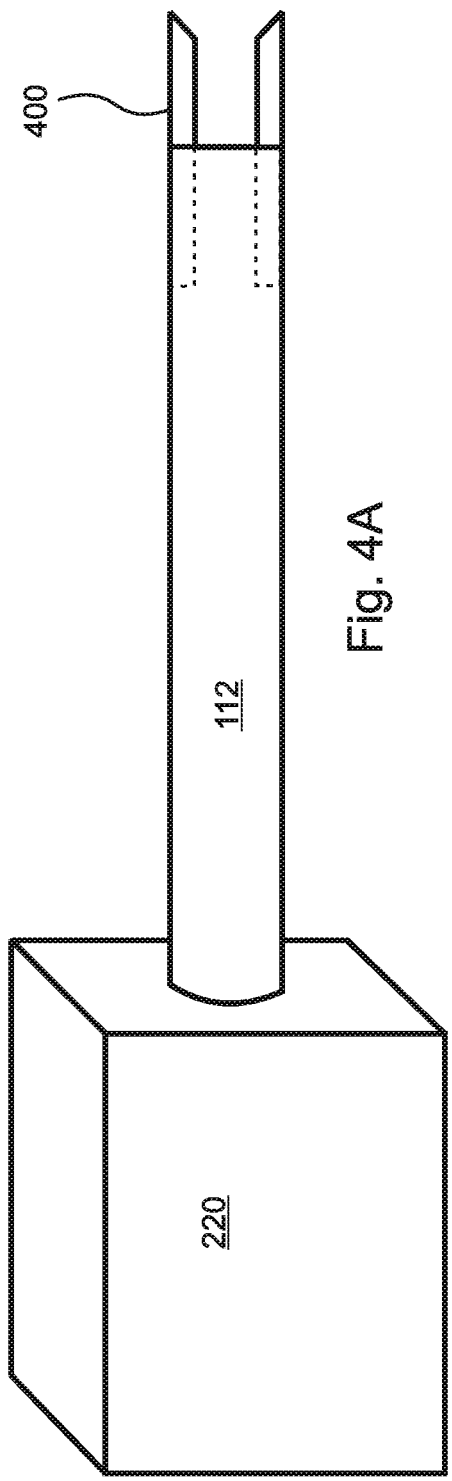
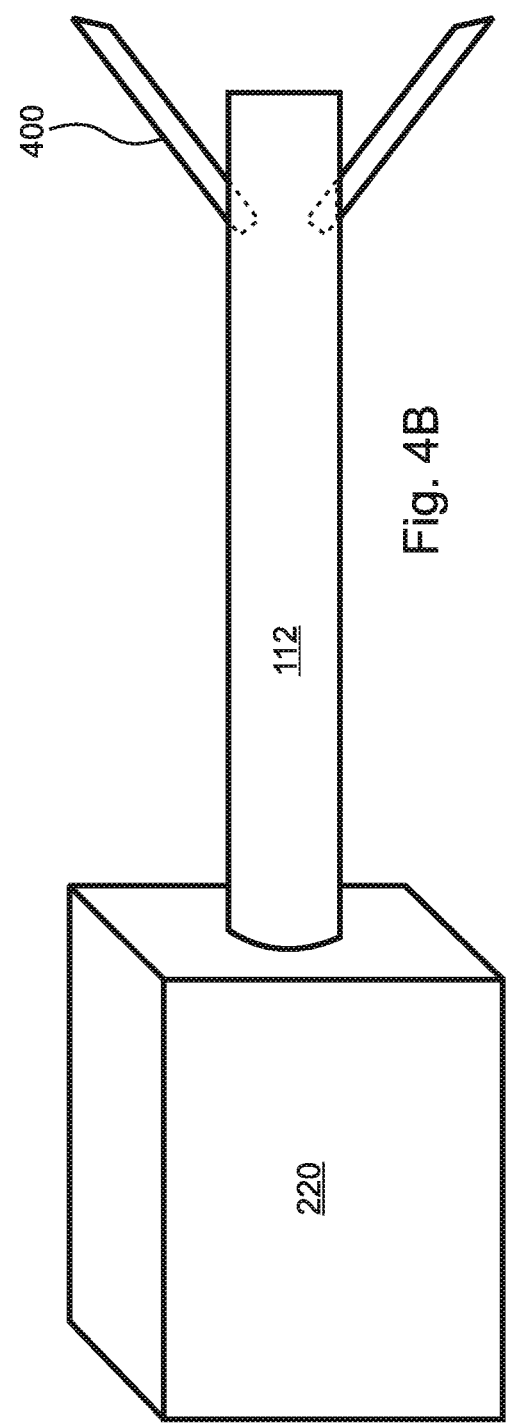

INSULATION INJECTION DEVICE

RELATED APPLICATIONS

This application claims the benefit of U.S. Provisional Application No. 62/833,721, filed Apr. 14, 2019. This application is also related to U.S. application Ser. No. 15/251,783 filed Aug. 30, 2016, which claims the benefit of U.S. provisional application 62/222,281 filed Sep. 23, 2015. All of these applications are incorporated herein by reference in their entirety for all purposes.

FIELD OF THE INVENTION

The invention relates to apparatus useful for application of insulation materials, and more particularly, to apparatus useful for dispensing insulation through small openings into enclosed cavities.

BACKGROUND OF THE INVENTION

Heating and cooling of buildings accounts for approximately 35% of all the energy consumed in the United States of America (USA). Thanks to numerous innovations in construction practices and materials used in new construction, new buildings typically use less than half the energy per square foot of older buildings. However, since most buildings last for 50 years or more, several generations will pass before the low energy consumption buildings that are currently being constructed begin to have a significant impact on the overall energy used by buildings in the USA.

Accordingly, it is often desirable to increase the thermal insulation of existing buildings. Often, insulation can be easily added above living spaces if there is an accessible attic or other space above the room ceilings. However, most walls, and most cathedral ceilings, are made up primarily of enclosed spaces bounded by inner and outer wall panels, and by studs, beams, and joists. These enclosed spaces, referred to herein generically as "building cavities," "wall cavities," "ceiling cavities," or simply as "cavities," are not accessible, and may be poorly insulated. Of course, wall and ceiling panels can be removed, and then replaced after new insulation has been installed, but this is a highly disruptive and expensive approach that is rarely used in practice.

A more common approach is to inject insulation into wall cavities and cathedral ceiling cavities through very small holes that are easily repaired afterward. According to this approach, small, temporary "panel" holes are made in either the interior or exterior wall panels and/or cathedral ceiling panels, and an insulating material is dispensed or "injected" into the cavities. The insulating material can be a particulate or fibrous insulating material that has good insulating properties. However, for large projects such as entire buildings a very large volume of the insulation may be required, which can be problematic and expensive to store and transport.

Another approach is to inject "foam-in-place" insulation into the cavities. According to this approach, with reference to FIG. 1, at least one foam "precursor" is injected as a liquid or spray into the building cavity 100 through the panel holes 102, whereupon the precursor undergoes a chemical reaction and is converted within the building cavity 100 into a foam that expands and fills the building cavity 100. At the job site, the foam-in-place precursors are typically stored in drums or pressure tanks, which are referred to herein generically as precursor "vessels" 107. As the precursors are injected through a panel hole 102 into a building cavity 100, precursor material flows from the one or more precursor vessels 107 through hoses 108 to a "proportioner" 114 where the precursors are mixed, and from there to a dispensing "gun" 110 that includes a "nozzle" 112 which is inserted through the panel hole 102. In some cases, the proportioner 114 is omitted, and the precursors are mixed within the dispensing gun 110 or the nozzle 112.

Attempts have been made to insulate wall cavities using a foam-in-place material that is formed by a single precursor, which typically reacts with ambient moisture to create the foam. However, these single component foams have generally yielded inconsistent results, due mainly to an inability to determine and control moisture levels within the cavities.

Instead, two-component foams are typically used for injected foam-in-place insulation. In comparison with single component foams, two-components foams can provide more consistent results, because the two components or "precursors" of the foam can be mixed and injected in controlled amounts and with a known ratio, so that they can fully react with each other within the building cavity to form the desired quantity of foam insulation.

Most commonly, a two-component low expansion foam, referred to herein as a "froth" foam, is used for injected insulation. Froth foams typically combine the two chemical precursor components with a gaseous blowing agent. They have the advantage that they only expand 3 to 5 times their post-dispense volume, thereby reducing the danger of over-filling of wall cavities and possible "blow-out" damage to the wall panels due to an overpressure of expanded foam.

Another approach is to use a "pour" foam, which is formed by mixing two liquid precursors together with a liquid blowing agent or with water, and which typically expands to about 30 times or more its post-dispense volume. For example, a polyurethane foam can be formed by a two-component mixture composed of isocyanate and polyol resin that are mixed near the tip of a dispensing "gun" just before injection into a building cavity. It should be noted that the term "pour foam" is used herein generically to refer to any foam that is formed by mixing two liquid components, and that expands to at least 20 times its post-dispense volume.

While much of the disclosure that is presented herein is directed to foam-in-place insulation, it should be understood that the term "precursor" is used generally herein to refer to any substance that can be injected through panel holes formed in a panel to fill a building cavity with insulation. Accordingly, unless otherwise required by context, the term "precursor" as used herein also includes insulating materials that do not undergo chemical reactions within a cavity, such as fibrous or granulate insulating materials that can be injected into a cavity. Furthermore, the term "precursors" is used generically herein to refer to precursors in the singular as well as in the plural, unless otherwise required by context. For example, a statement that "precursors" are injected into a cavity should be taken to refer also to instances and embodiments where a single precursor is injected, unless the context requires that more than one precursor is injected.

The approach of injecting insulation materials through small panel holes provided in wall and ceiling cavities is certainly quicker and less costly than the approach of removing and replacing entire wall panels. Nevertheless, it can be time consuming and expensive to drill the large number of panel holes in the wall and ceiling panels that can be required for a large insulation project, such as re-insulating an entire building. Typically, each cavity can require approximately 4 panel holes, which means that in a typical 2500 square foot building it will be necessary to drill approximately 1000 panel holes.

In theory, it would be possible to select and drill all of the required panel holes as a preliminary phase of the project, and then to inject the insulation in a second phase. However, the selection of the panel hole locations for each cavity can be critical to achieving an optimal result, especially in the case of foam-in-place applications, because the spreading, drooping, and sagging behaviors of the foam as it expands within the cavity will depend strongly on where it is injected relative to the dimensions and shape of each cavity. This is discussed in more detail in U.S. application Ser. No. 15/251, 783, filed Aug. 30, 2016, which is incorporated herein by reference in their entirety for all purposes.

Accordingly, in practice it is often desirable for the operator who is injecting the insulation to evaluate each cavity and select the panel hole locations immediately before the insulation is injected. As a result, the operator can be required to alternate frequently between using a drilling apparatus to drill panel holes and operating the insulation injecting apparatus. Another possibility is to provide a second technician who will drill the panel holes under the direction of the insulation operator immediately before the precursors are injected. Either of these approaches increases the required time and cost for the project.

Typically, a building cavity that is to be filled with injected insulation already contains some form of previously installed particulate or fibrous insulation. Another problem that can arise during the injection of new insulation is that a nozzle can become partially or fully clogged when it is inserted into the cavity and encounters fibers and/or particles of the pre-existing insulation. Similarly, if the nozzle is inserted too deeply into a cavity, it can come to rest on the inside face of the sheathing or panel on the opposite side of the cavity, thereby blocking the nozzle. When a nozzle is partially or fully blocked, the flow of insulating material into the cavity can be impeded, so that the cavity is not completely filled. Furthermore, in the case of foam-in-place insulation, a blocked flow of precursor material can cause the precursors to react within the nozzle and hoses, so that the gun and hoses are clogged and potentially ruined by the expanded and hardened foam.

Another problem that applies to most insulation injection devices is that they are limited to injecting only a few types of insulation. For example, an insulation injection gun that is suitable for injecting two-component pour foam insulation may not be suitable for injecting a particulate insulation or a froth foam insulation. Furthermore, even when a single type of insulation material is used throughout a project, various cavities may require different injection nozzle features, such as providing lateral dispensing ports in different locations along the nozzle. As a result, it can be necessary to provide a plurality of injection guns, and/or a gun that accepts a plurality of exchangeable nozzles, so as to enable the injection of a wider variety of types of insulating materials.

Yet another problem that can be encountered during injection of insulating materials into cavities is that the insulating material can be injected on the wrong side of pre-existing insulation within the cavity, especially in the case of pre-existing unfaced batts of insulation. In particular, when foam-in-place insulation is injected into a cavity that is already filled with fibrous insulation, it can be important to position the foam on the exterior side of the fibrous insulation, so as to reduce the potential for moisture problems and to reduce the potential for voids to form within the foam. If the nozzle is inserted into the cavity from the interior of the building, it can sometimes fail to fully penetrate the fibrous insulation, and may deposit the foam either on the interior side of the fibrous insulation or into the center of the fibrous insulation. Similarly, when the nozzle is inserted into the cavity through the exterior sheathing, it may inadvertently penetrate the existing fibrous insulation, and may deposit the foam either on the interior side of the fibrous insulation or into the center of the fibrous insulation.

Still another problem that can arise when injecting insulating materials into wall and ceiling cavities is that small amounts of insulation material can be inadvertently dripped onto the front of a wall or ceiling panel as the nozzle is withdrawn from a panel hole, or as an excess of expanding foam exudes outward through the panel hole. Foam that is dripped from a panel hole can then congeal and harden on the exterior of a panel, thereby requiring removal of the hardened excess foam from the panel in addition to repairing of the panel holes.

What is needed therefore is a building cavity insulation injection device that reduces the cost and effort required to create panel holes, avoids blockage of the injection nozzle by pre-existing insulation, ensures that insulation is injected on a desired side of pre-existing insulation, enables injection of a wider variety of types of insulation and/or injection into a wider variety of cavity configurations without exchanging injection guns or nozzles, and avoids dripping of excess insulation onto outer surfaces of cavity panels.

SUMMARY OF THE INVENTION

The present invention is a building cavity insulation injection device that, in various embodiments, reduces the cost and effort required to create panel holes, avoids blockage of the injection nozzle, ensures that insulation is injected on a desired side of pre-existing insulation, enables injection of a wider variety of types of insulation and/or injection into a wider variety of cavity configurations without exchanging injection guns or nozzles, and avoids dripping of excess insulation on outer surfaces of cavity panels.

Embodiments of the present invention include an insulation dispensing gun having a nozzle that is beveled or pointed at its tip. In some of these embodiments, the dispensing nozzle is able to penetrate through a panel of a building cavity such as a wall and/or ceiling cavity, which enables the operator to create the panel holes and to dispense the insulating material into the cavity as a combined action, i.e. without being required to switch between a drill or other hole-making apparatus and the dispensing gun.

In various embodiments, the beveled or pointed end of the dispensing nozzle reduces any tendency for pre-existing insulation particles and/or fibers to enter and clog the nozzle. Furthermore, the beveled or pointed end of the nozzle prevents the nozzle from being blocked if it penetrates completely through the cavity and contacts the distal sheathing or panel of the cavity. In such a case, only the tip of the beveled or pointed end of the nozzle contacts that sheathing, while the insulation material is dispensed laterally from the beveled opening and/or from separate side openings that are provided on the injection nozzle.

In cases where the invention is used to dispense foam-in-place insulation into a wall or ceiling cavity through an interior panel, and where it is desirable for the foam to be deposited proximal to the exterior boundary of the cavity, on the far side of previously installed insulation, the beveled or pointed tip of the dispensing nozzle in embodiments of the present invention helps to ensure that the nozzle will penetrate fully through the pre-existing insulation, and will not deposit the foam either in front of or within the pre-existing insulation.

For applications where it is desired to inject insulation materials within a cavity on a proximal side of pre-existing insulation, i.e. without penetrating through the preexisting insulation, embodiments include a nozzle with front-facing expandable wings and/or a deformable "bulbous" end that pushes and compresses the pre-existing insulation material forward as the nozzle is inserted into the cavity, thereby creating space in front of the pre-existing insulation into which the insulation material can be injected. In other embodiments, the insulation injection apparatus includes exchangeable offset collars that can be installed on the nozzle, where the offset collars are wider in diameter than the panel holes, and are of varying lengths. The operator is thereby able to select an offset collar that will contact the outer surface of the wall or ceiling panel just as the tip of the nozzle enters the cavity, thereby ensuring that the insulating material is injected on the proximal side of the pre-existing insulation.

For applications where it is desirable to deposit insulation material on a distal side of pre-existing insulation, a beveled or pointed nozzle tip can be combined with rear-facing expandable wings that will unfold after penetrating through the pre-existing insulation, and will pull and compress the pre-existing insulation away from the distal sheath of the cavity when the gun is pulled slightly back from contact with the distal sheath, thereby creating a space where the insulating material can be deposited proximal to the distal sheath. Furthermore, embodiments that include offset collars enable the operator to select an offset collar that will position the tip of the injection nozzle near to but slightly offset from the distal sheath of the cavity, thereby ensuring that the insulation material is injected proximal to the distal sheath, while also ensuring that the distal end of the nozzle is not blocked by being pressed against the distal sheath.

In embodiments, the disclosed insulation injection device includes an additional input port, referred to herein as an "enhancement port" that significantly increases the variety of types of insulation that can be injected using the disclosed device. In various embodiments, and for various applications, the enhancement port can be used for injecting a carrier gas into the stream of insulation material, injection of pre-expanded beads of foam and/or other insulation particulates, injection of fibrous insulation, injection of a foaming binder, injection of a fire retardant, and/or injection of other gasses and/or liquids into the flow of insulation material.

For example, if two liquid precursors are being mixed immediately before they are injected into the cavity, the additional port can be used to inject a carrier gas that will supply mixing energy to enhance the mixing of the two liquid precursors, thereby ensuring that the precursors are thoroughly mixed before they react.

In another example, the enhancement port can be used to inject insulating particulates into a flow of one or more foam precursors, for example to reduce the effective expansion factor of a two-component pour foam. This approach can enable the particles to be coated by the liquid foam precursors as they are injected into the cavity, with the result that the liquid precursors then react within the cavity to form a binder that surrounds and suspends the particles. Similarly, if particles are being dispensed through the conventional hose or hoses of the dispensing gun, then a foam precursor can be injected through the enhancement port to coat the particles and form the suspending binder within the cavity.

So as to enable the disclosed injection apparatus to inject insulating materials into a wider variety of cavity configurations without exchanging injection guns or nozzles, in embodiments the injection nozzle includes a plurality of lateral dispensing ports at spaced-apart locations along the dispensing nozzle. According to these embodiments, a plurality of nozzle-adapting collars are provided of differing length. The nozzle-adapting collars fit closely around the nozzle, and can be used to cover all or a selected subset of the lateral dispensing ports, thereby allowing a single nozzle to be used for dispensing insulation at differing combinations of depths and/or in differing directions according to the requirements of each cavity configuration.

Various embodiments include an expandable "nozzle sheath" that is configured to surround the nozzle and to extend between the injection gun and the outer surface of the cavity panel. As the nozzle is inserted into the panel hole, the nozzle sheath is compressed, and as the nozzle is withdrawn from the panel hole the nozzle sheath re-expands, while maintaining a seal between the gun and the wall panel, thereby inhibiting any excess insulation material from inadvertently dripping out from the panel hole. In the case of foam-in-place insulation, it is only necessary to maintain the nozzle sheath against the wall panel for a few seconds after an injection shot has been completed, after which any excess foam will have completed its expansion and will have hardened. In embodiments, the nozzle sheath can be either a flexible bellows or a spring that is surrounded by a layer of flexible material.

While much of the disclosure that is presented herein is directed to foam-in-place insulation, it should be understood that the term "precursor" is used generally herein to refer to any substance that can be injected through panel holes formed in a panel to fill a building cavity with insulation. Accordingly, unless otherwise required by context, the term "precursor" as used herein also includes insulating materials that do not undergo chemical reactions within a cavity, such as fibrous or granulate insulating materials that can be injected into a cavity. Furthermore, the term "precursors" is used generically herein to refer to precursors in the singular as well as in the plural, unless otherwise required by context. For example, a statement that "precursors" are injected into a cavity should be taken to refer also to instances and embodiments where a single precursor is injected, unless the context requires that more than one precursor is injected.

One general aspect of the present invention is a thermal insulation injection device that is configured to inject a thermal insulation precursor into a building cavity. The thermal insulation injection device includes an input port provided in a body of the thermal insulation injection device, the input port being configured to receive an insulation precursor from a precursor supply vessel, and a nozzle extending from the body, the nozzle being configured for insertion into a building cavity through a panel hole provided in a proximal panel of the building cavity, and for injecting the insulation precursor into the building cavity. The nozzle is configured to direct the thermal insulation precursor from the input port through a central passage of the nozzle and out through at least one dispensing port of the nozzle into the building cavity. Also, the nozzle has a substantially uniform cross-sectional shape and area extending over a central region thereof from a proximal end thereof to a distal tapered region thereof, the distal tapered region being terminated at a distal tip having a cross-sectional area that is no more than 10% as large as the cross-sectional area of the central region.

In embodiments the distal tapered region is a beveled distal end of the nozzle, the distal tip being substantially aligned with an outer wall of the nozzle.

In any of the above embodiments, the distal tip can be substantially aligned with a longitudinal axis of the nozzle.

In any of the above embodiments, at least one of the dispensing ports can be provided in the distal tapered region of the nozzle.

Any of the above embodiments can be configured such that none of the dispensing ports are provided in the distal tapered region of the nozzle.

In any of the above embodiments, at least one of the dispensing ports of the nozzle can be provided in a side of the central region of the nozzle.

In any of the above embodiments, when the distal tip is pressed against the proximal panel, the nozzle can be able to penetrate through the proximal panel, thereby creating the panel hole.

In any of the above embodiments, the injection device can be configured to inject a foam-in-place precursor into the building cavity.

In any of the above embodiments, the injection device can be configured to inject a mixed plurality of foam-in-place precursors into the building cavity.

Any of the above embodiments can further include an enhancement port that is configured to receive an enhancing material for injecting thereof together with the insulation precursor into the building cavity. In some of these embodiments, the enhancement port is provided in the central region of the nozzle. In any of these embodiments, the enhancing material can be one of a carrier fluid, a particulate insulating material, a fibrous insulating material, a binder, and a fire retardant.

Any of the above embodiments can further include expandable wings configured for co-alignment with the nozzle and insertion with the nozzle through the panel hole into the building cavity, the expandable wings being further configured to expand radially outward from the nozzle after insertion within the building cavity and to compress pre-existing insulation within the building cavity, thereby enlarging a space within with building cavity wherein the thermal insulation precursor can be deposited.

Any of the above embodiments can further include a compressible nozzle drip sheath that surrounds and is co-axial with the nozzle, the nozzle drip sheath having an expanded length that is greater than a length of the nozzle, the nozzle drip sheath having a diameter that is great than a diameter of the panel hole, the nozzle drip sheath being configured to extend between the body of the thermal insulation injection device and the proximal panel of the building cavity, and to be respectively compressed and expanded as the nozzle is inserted into and removed from the panel hole, the nozzle drip sheath thereby maintaining a seal between the body of the injection device and the proximal panel of the building cavity, such that any material that is discharged from the building cavity through the panel hole while the nozzle drip sheath is in contact with the proximal panel of the building cavity will be contained within the nozzle drip sheath. In some of these embodiments the nozzle drip sheath comprises a spring that is surrounded by at least one of a compressible bellows and a layer of a flexible material.

Any of the above embodiments can further include an exchangeable, incompressible offset collar that can coaxially surround the nozzle, the offset collar having a length that is less than a length of the nozzle, the offset collar having a diameter that is great than a diameter of the panel hole, the offset collar being configured to extend between the body and the proximal panel of the building cavity when the nozzle is inserted through the panel hole, the offset nozzle thereby limiting and determining a penetration depth of the nozzle into the cavity.

In any of the above embodiments, a plurality of dispensing ports can be provided along at least one side of the nozzle, and the injection device can further include a nozzle-adapting collar that is configured for surrounding coaxial installation onto the nozzle so as to cover and block at least one of the dispensing ports. In some of these embodiments the nozzle-adapting collar has an outer diameter that is smaller than a diameter of the panel hole, so that the nozzle-adapting collar is able to enter into the building cavity together with the nozzle.

A second general aspect of the present invention is a method of injecting thermal insulation into a building cavity. The method includes providing a thermal injection device according to any embodiment of the first general aspect where all of the dispensing ports are provided on at least one side of the central region of the nozzle in locations that position the dispensing ports proximal to the proximal panel when the distal tip of the nozzle is in contact with a distal panel of the building cavity, inserting the nozzle into the building cavity through the panel hole until the distal tip of the nozzle contacts the distal panel of the building cavity, and dispensing the thermal insulation through the dispensing ports, thereby injecting the thermal insulation into the building cavity proximal to the proximal panel.

And a third general aspect of the present invention is a method of injecting thermal insulation into a building cavity, where the method includes providing a thermal injection device according to any embodiment of the first general aspect, positioning the distal tip of the nozzle against a wall panel of the building cavity, pressing nozzle against the wall panel, thereby causing the distal tip to penetrate into the wall panel, continuing to press the nozzle against the wall panel, thereby forming the panel hole and causing the nozzle to enter into the building cavity, dispensing the thermal insulation through the nozzle into the building cavity, and withdrawing the nozzle from the panel hole.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 4A illustrates a nozzle in an embodiment that includes front facing expandable wings, where the expandable wings are shown in a folded configuration;

FIG. 4B illustrates the nozzle of FIG. 4A, where the front facing expandable wings are shown in an expanded configuration;

DETAILED DESCRIPTION

The present invention is a building cavity insulation injection device that, in various embodiments, reduces the cost and effort required to create panel holes, avoids blockage of the injection nozzle, ensures that insulation is injected on a desired side of pre-existing insulation, enables injection of a wider variety of types of insulation and/or injection into a wider variety of cavity configurations without exchanging injection guns or nozzles, and avoids dripping of excess insulation on outer surfaces of cavity panels.

Figure 1:
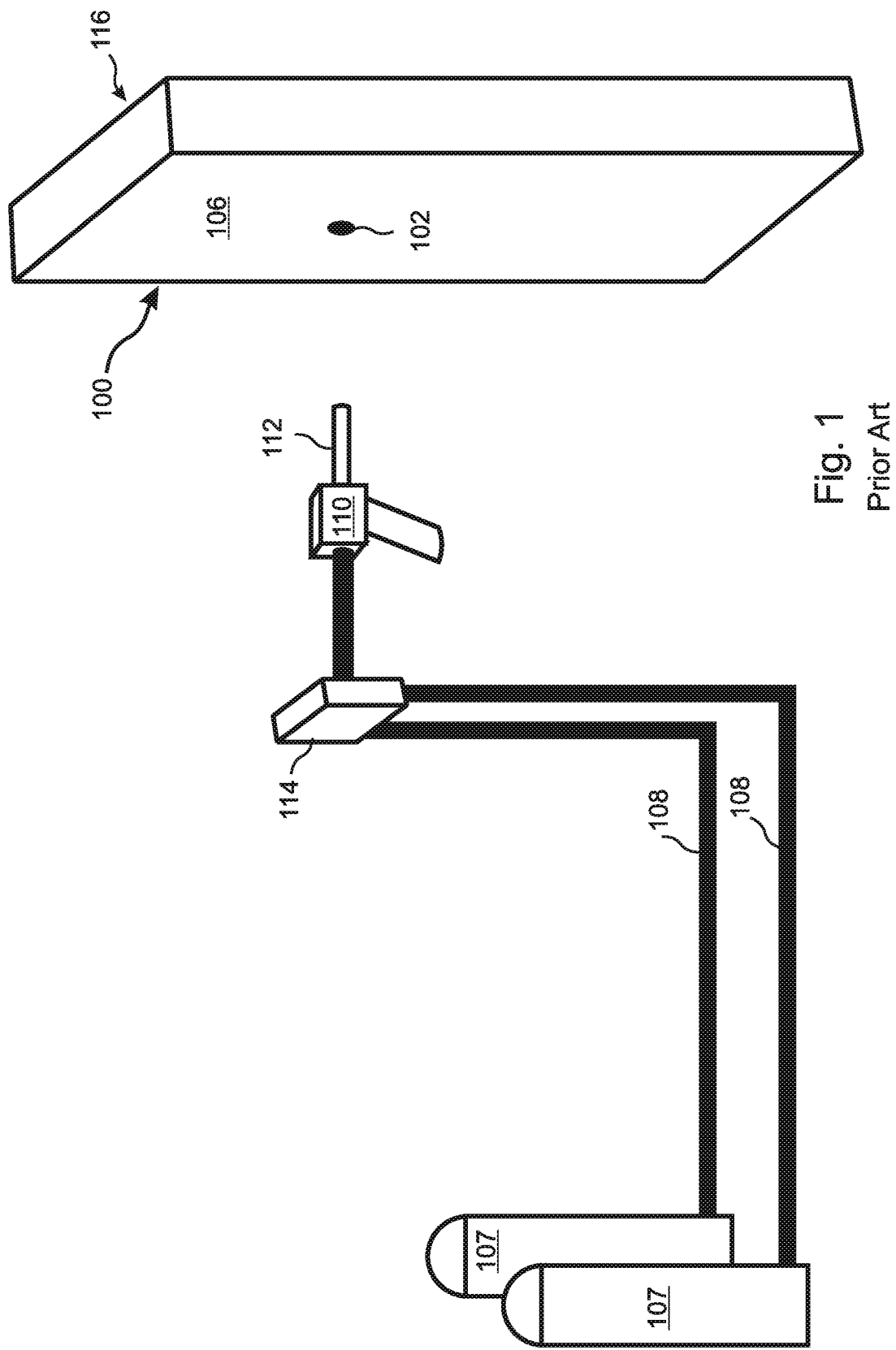
FIG. 1 is a simplified illustration of the components of a typical foam-in-place thermal insulation injection system of the prior art.
Figure 2A:
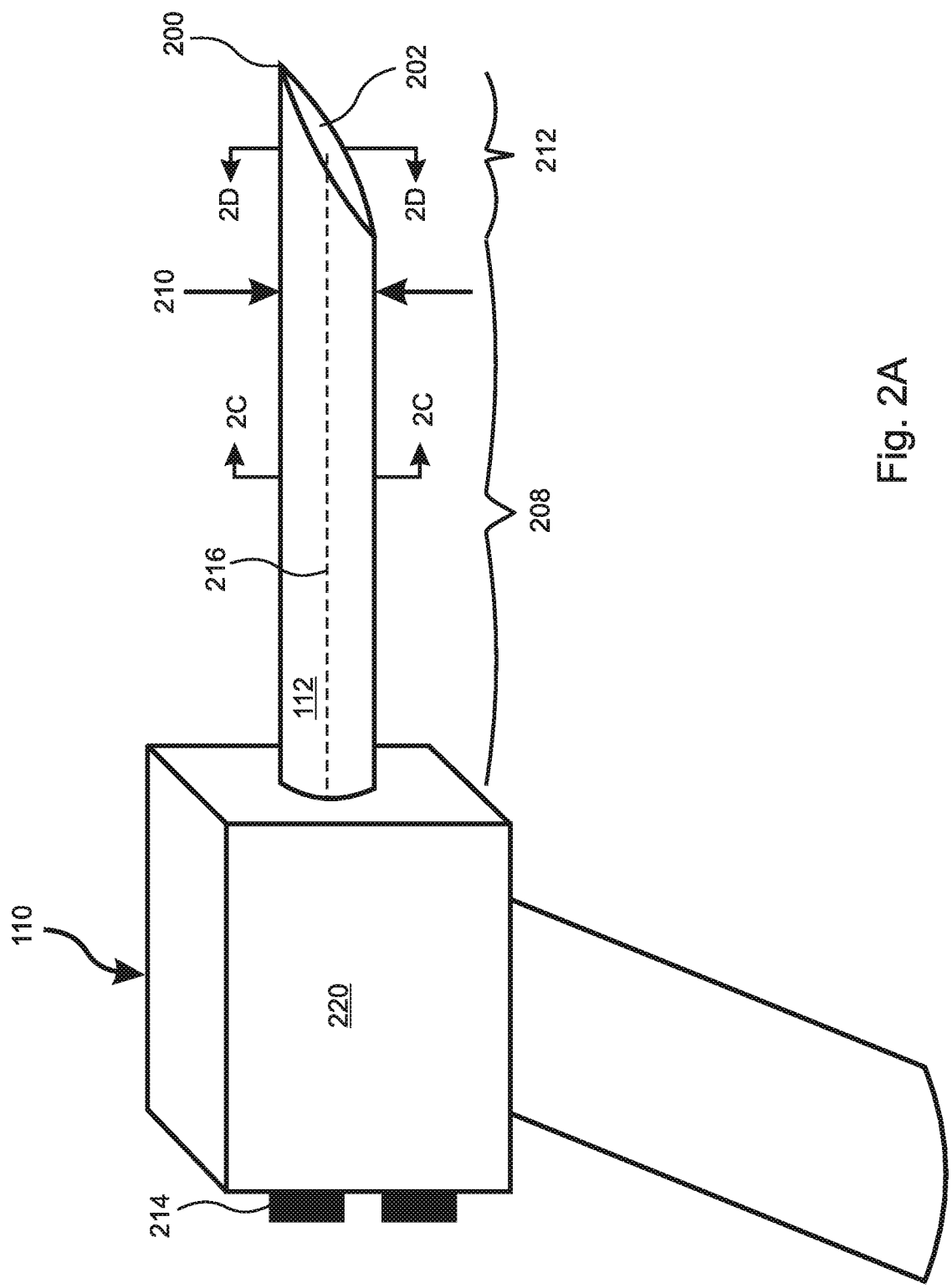
FIG. 2A is a perspective view of a thermal insulation injection gun in an embodiment of the present invention wherein the injection nozzle terminates in a distal tapered region having a beveled tip.
Figure 2B:
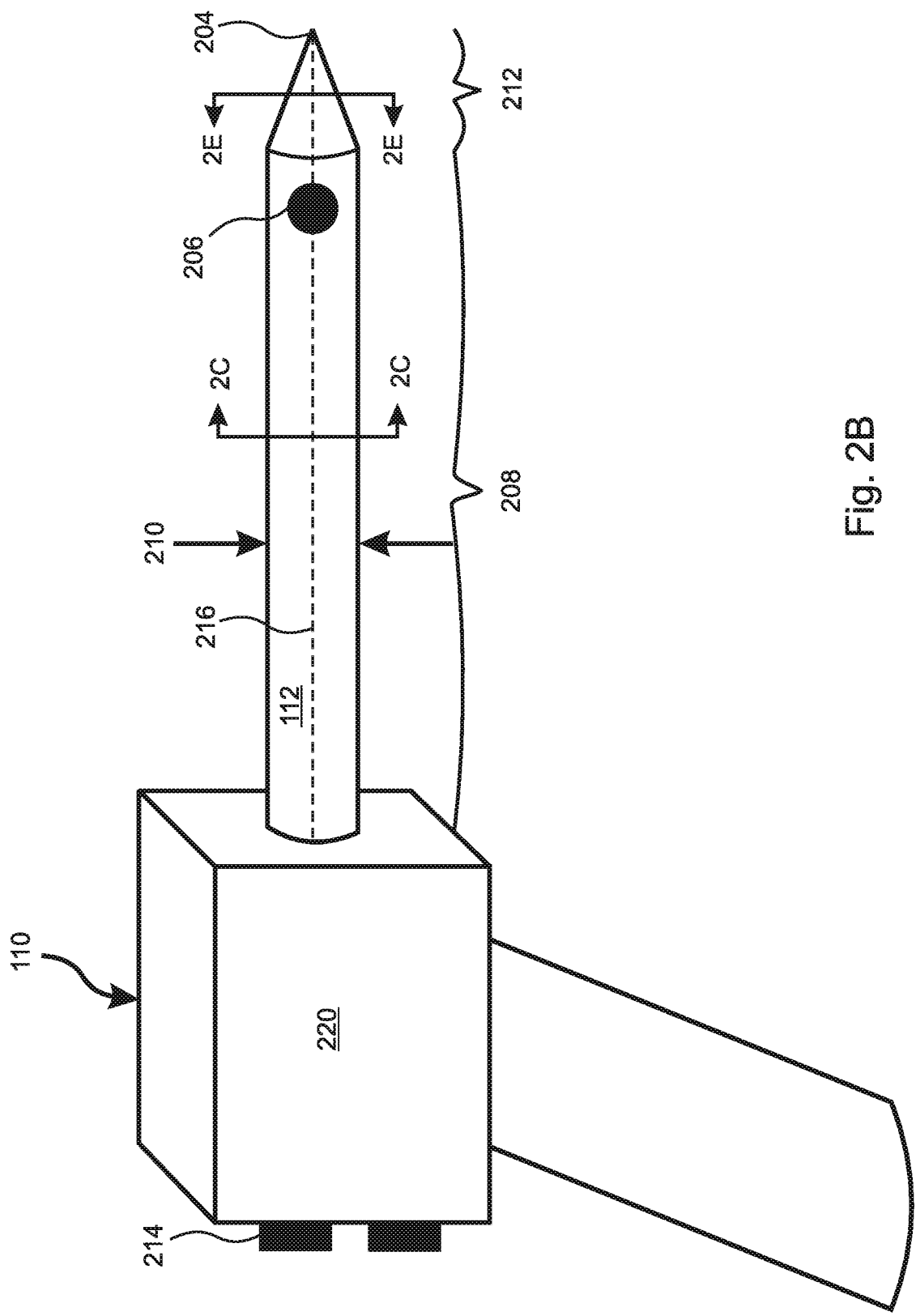
FIG. 2B is a perspective view of a thermal insulation injection gun in an embodiment of the present invention wherein the injection nozzle terminates in a distal tapered region having a conical tip.

With reference to FIGS. 2A and 2B, embodiments of the present invention include an insulation dispensing gun 110 having a body 220 and a nozzle 112 that includes input ports 214 configured to receive one or more insulation precursors from precursor vessels (107 in FIG. 1) and to direct the precursors through a central passage of a nozzle 112 and out through a dispensing port provided at the end 202 of the nozzle 112, and/or on a side 206 of the nozzle 112 into a building cavity 100 such as a wall cavity or a cavity of a cathedral ceiling. As shown in the figures, the nozzle 112 includes a central region 208 having a substantially uniform shape and cross-section 210, and thereby a uniform cross-sectional area. The nozzle 112 further comprises a distal tapered region 212 that terminates at a pointed distal tip 200, 204 having a cross-sectional area that is no more than 10% of the cross-sectional area of the central region 208.

Figure 2C:
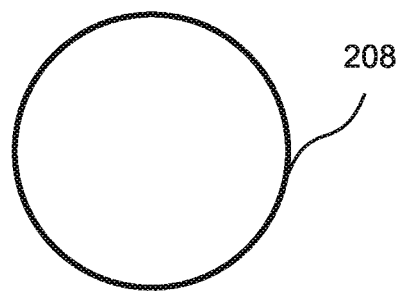
FIG. 2C is a cross section of the nozzle of FIG. 2A in the central region
Figure 2D:
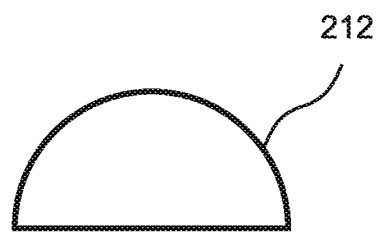
FIG. 2D is a cross section of the nozzle of FIG. 2A in the tapered region
Figure 2E:
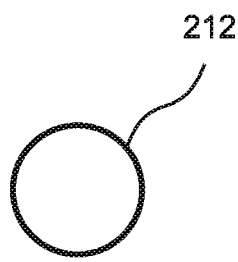
FIG. 2E is a cross section of the nozzle of FIG. 2B in the tapered region

In the embodiments of FIGS. 2A and 2B the central region 208 is round, as shown in the cross section of FIG. 2C. In other embodiments, it can be square, triangular, or any other desired shape. In the embodiment of FIG. 2A, the distal tapered region 212 terminates in a beveled tip 200 that is aligned with the outer wall of the nozzle 112. A cross section of the tapered region 212 of FIG. 2A is presented in FIG. 2D. In the embodiment of FIG. 2B, the tapered region 212 is conical, and terminates in a pointed tip 204 that is substantially aligned with a longitudinal axis 216 of the nozzle. A cross section of the tapered region 212 of FIG. 2B is presented in FIG. 2E.

The dispensing port 202 in the embodiment of FIG. 2A is an opening provided in the distal tapered region 212 of the nozzle 112, while the dispensing port 206 in the embodiment of FIG. 2B is provided in the side wall of the central region 208 of the nozzle 112. In other embodiments, the nozzle 112 has a beveled tip 200 that includes one or more dispensing ports 206 in the side wall of the central region 208 in addition to or instead of a dispensing port 202 in the beveled tip 200. Similarly, in various embodiments the nozzle 112 has a conical tip 200 that includes a dispensing port 202 in the conical tip, in addition to or instead of one or more dispensing ports 206 in the side wall of the central region 208. Dispensing ports 206 provided in the side wall of the central region 208 can be configured to dispense insulating material in a single direction or in a plurality of directions.

In some of these embodiments, when a pointed distal tip 200, 204 of a nozzle 112 is pressed against a sheathing panel (116 in FIG. 1) of a wall and/or ceiling cavity (100 in FIG. 1), the dispensing nozzle 112 is able to penetrate through the panel, which enables the operator to create the panel holes 102 and to dispense the insulating material into the building cavity 100 as a combined action, i.e. without requiring a separate drill or other hole-making apparatus, and without being required to switch between a drill or other hole-making apparatus and the dispensing gun.

In various embodiments, the distal tapered region 212 of the dispensing nozzle 112 reduces any tendency for pre-existing insulation particles and/or fibers to enter and clog the nozzle. Furthermore, the distal tapered region 212 prevents the nozzle 112 from being blocked if it penetrates completely through the cavity and contacts the distal sheathing panel 116 of the building cavity 100. In such a case, only the pointed distal tip 200, 204 of the nozzle contacts the distal sheathing panel 116, while the insulation material is dispensed laterally from the dispensing ports 202, 206 that are provided on the injection nozzle 112.

Figure 2F:
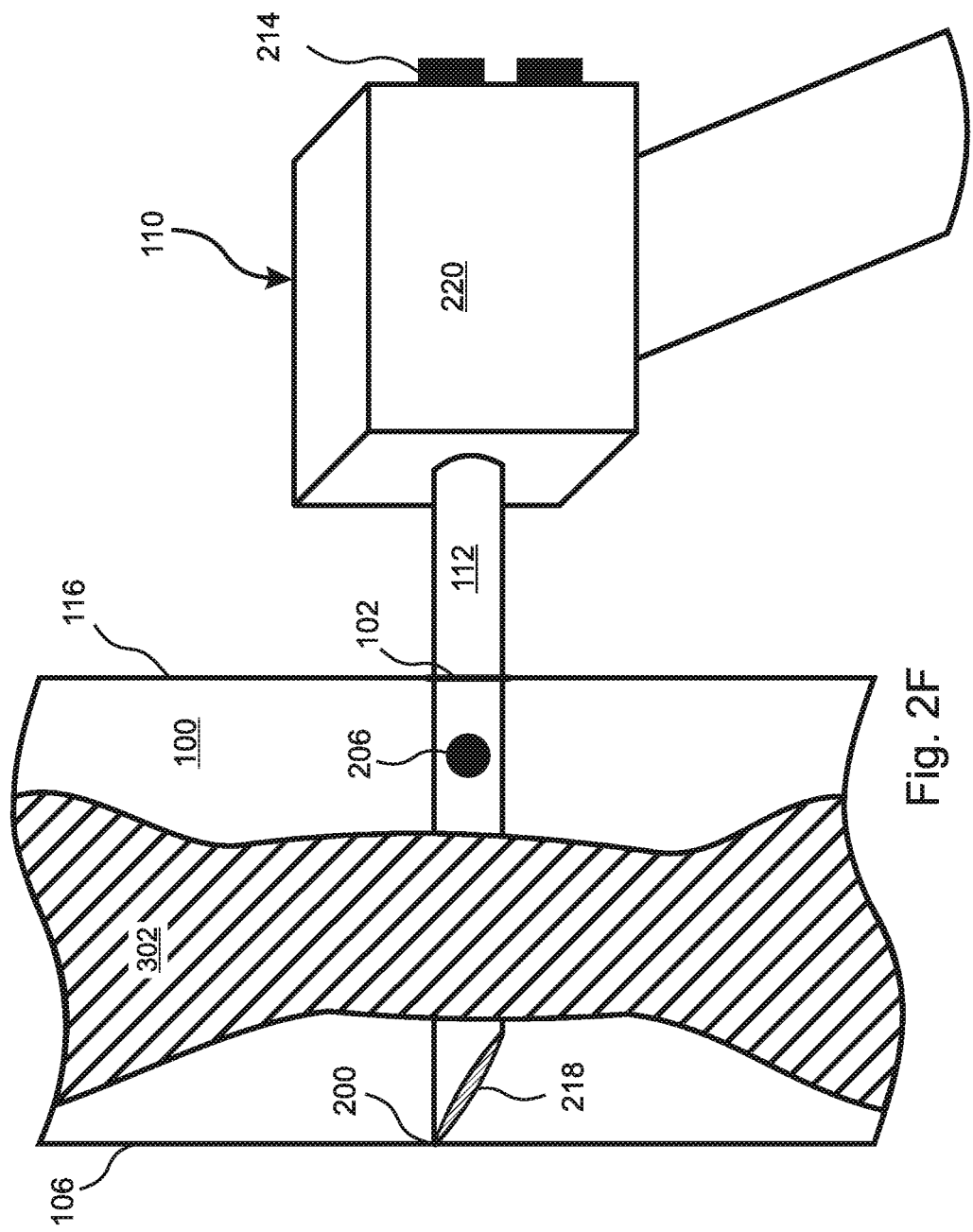
FIG. 2F is a perspective view illustrating penetration of a nozzle into a wall cavity through an exterior panel of the wall cavity, where the nozzle is similar to FIG. 2A but includes a sealed end and dispensing ports on sides of the nozzle.

With reference to FIG. 2F, in cases where the invention is used to dispense insulation into a wall cavity 100 through an exterior sheathing panel 116, and where it is desirable for the insulating material to be deposited proximal to the exterior sheathing panel 116, the nozzle 112 can include a distal tapered region 212 that includes a sealed end 218, i.e. does not include a dispensing port 202 in the distal tapered region 212. The pointed distal tip 200 can be used to penetrate the previously installed insulation 302 as the nozzle 112 is inserted into the cavity 100 until the pointed distal tip 200 rests against the interior panel 106. The insulating material can then be injected into the wall cavity 100 through at least one dispensing port 206 provided on a side of the nozzle 112 at a location that will place the dispensing port(s) 206 within the cavity 100 proximal to the exterior sheathing panel 116 when the pointed distal tip 200 rests against the interior panel 106. For example, a pair of opposed, sideward facing dispensing ports 206 can be provided, as shown in FIG. 2F (only one of the ports 206 is visible), or a single, downward-facing dispensing port 206 can be provided, or any other desired combination of one or more sideward facing dispensing ports 206 can be provided. For example, a sideward facing dispensing ports 206 can be positioned on the nozzle 112 such that when the pointed distal tip 200 rests against the interior panel 106 the point of dispensing will be offset by approximately ½" from the exterior sheathing panel 116.

Figure 2G:
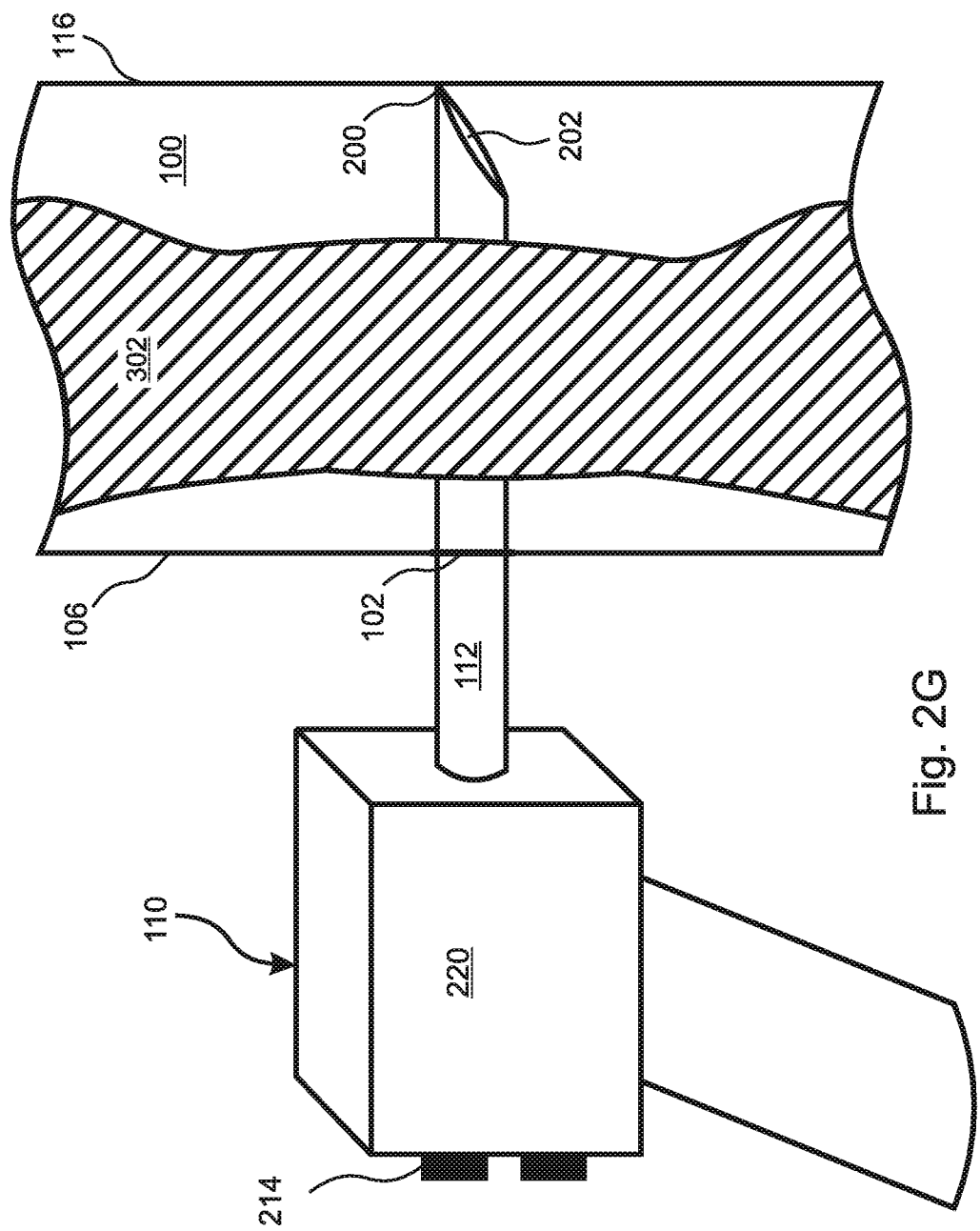
FIG. 2G is a perspective view illustrating penetration of the nozzle of FIG. 2A into a wall cavity through an interior panel of the wall cavity, and through a layer of pre-existing thermal insulation.

With further reference to FIG. 2F, in cases where the invention is used to dispense material into an open ceiling cavity, such as into an attic floor, and where it is desirable for the insulating material to be deposited proximal to an interior panel 106, such as a ceiling panel, the insulating material can be injected into the cavity 100 through at least one dispensing port 206 provided on a side of the nozzle 112 at a location that will place the dispensing port(s) 206 within the cavity 100 proximal to the interior panel 106, for example approximately ½ inch from the interior panel 106. With reference to FIG. 2G, in cases where the invention is used to dispense insulating material into a wall or ceiling cavity 100 through an interior panel 106, and where it is desirable for the insulating material to be deposited into a space formed between previously installed insulation 302 and the exterior sheathing panel 116, the insulating material can be dispensed from a dispensing port 202 provided in the distal tapered region 212 of the nozzle 112. In such cases, the pointed distal tip 200 of the dispensing nozzle 112 in embodiments of the present invention helps to ensure that the nozzle 112 will penetrate fully through the pre-existing insulation 302, and will not deposit the insulating material either in front of or within the pre-existing insulation 302.

Figure 2H:
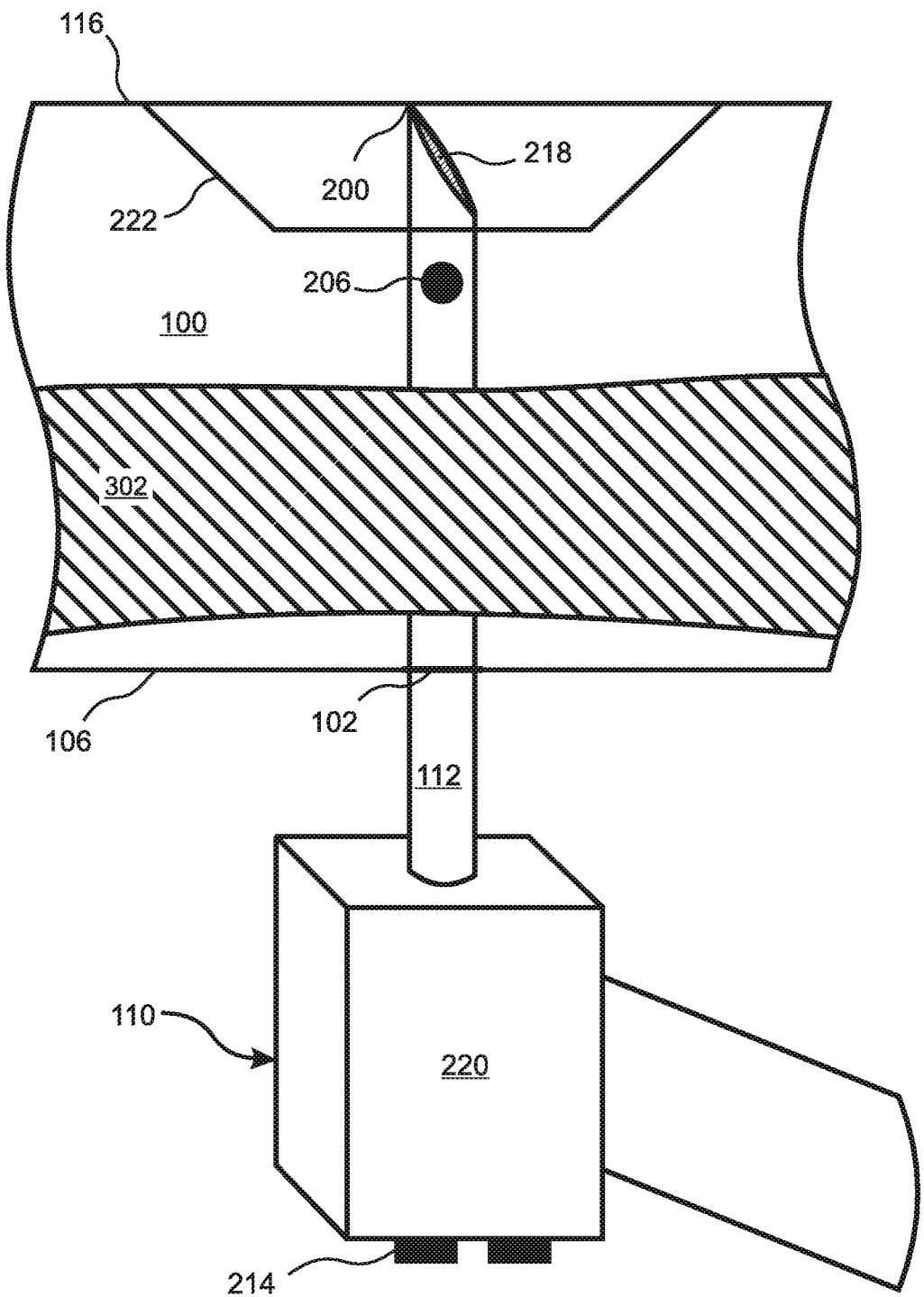
FIG. 2H is a perspective view illustrating penetration of the nozzle of FIG. 2F through an interior panel of a cathedral ceiling cavity, through pre-existing insulation within the cavity, and through a wall vent within the cavity.

Similarly, with reference to FIG. 2H, in cases where the invention is used to dispense material into a cathedral ceiling cavity 100 through an interior panel 106 and where it is desirable for the insulating material to be deposited proximal to a rafter vent 222, the pointed tip 200 can be used to penetrate through the interior panel 106, through pre-existing insulation 302, and through the rafter vent 222, so that it comes to rest against the exterior sheathing 116, and the insulating material can be injected into the cavity 100 through at least one dispensing port 206 provided on a side of the nozzle 112 at a location that will place the dispensing port(s) 206 within the cavity 100 proximal to the rafter vent 222 and distal to the pre-existing insulation 302. For example, the dispensing port(s) 206 can be offset by approximately ½" from the rafter vent. In the case of an open ceiling cavity 100, the dispensing port(s) can be offset by approximately ½" from the interior panel 106.

Figure 3A:
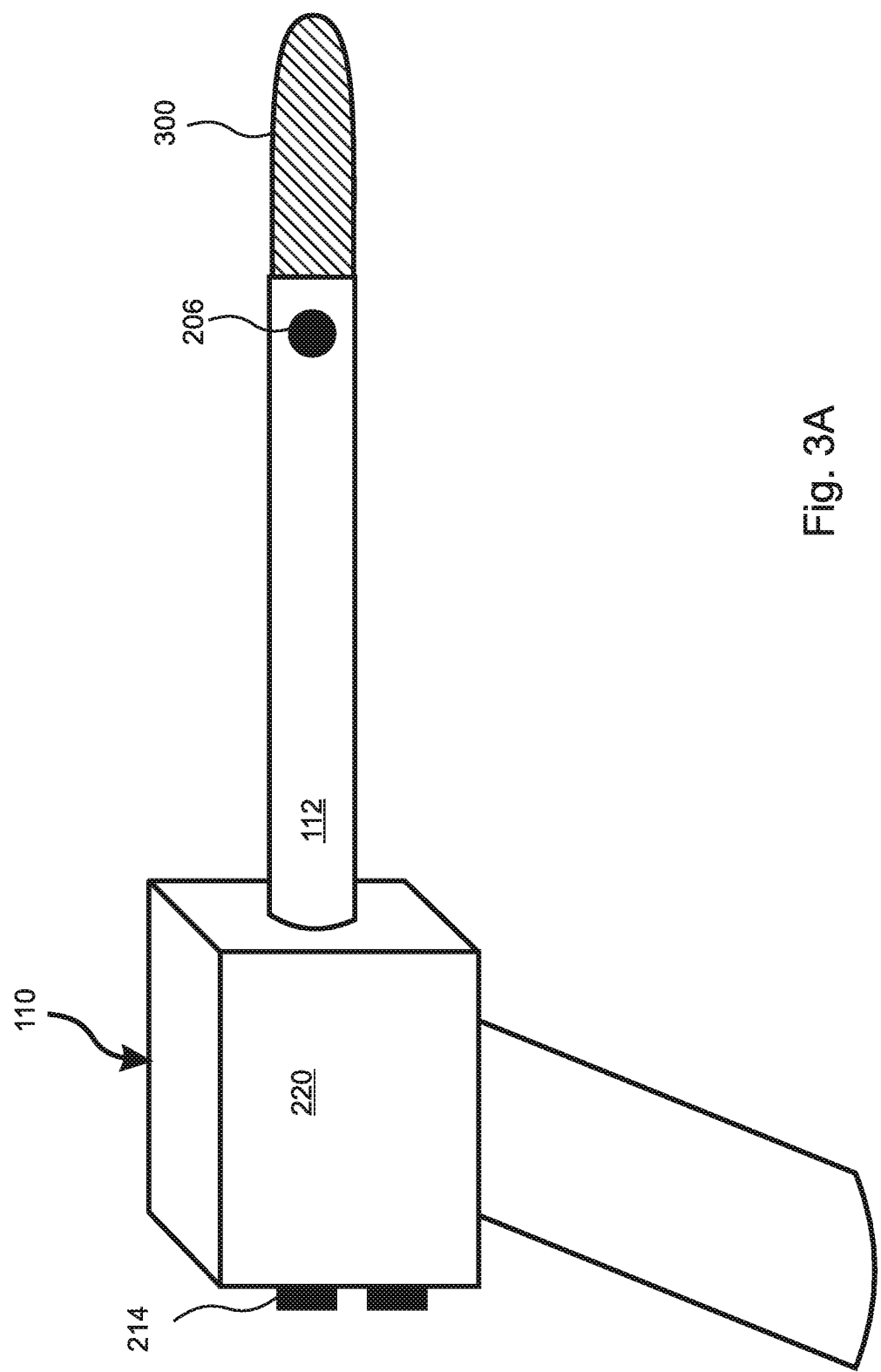
FIG. 3A illustrates a nozzle in an embodiment that includes a deformable bulbous end, where the expandable bulbous end is shown in an unexpanded configuration.
Figure 3B:
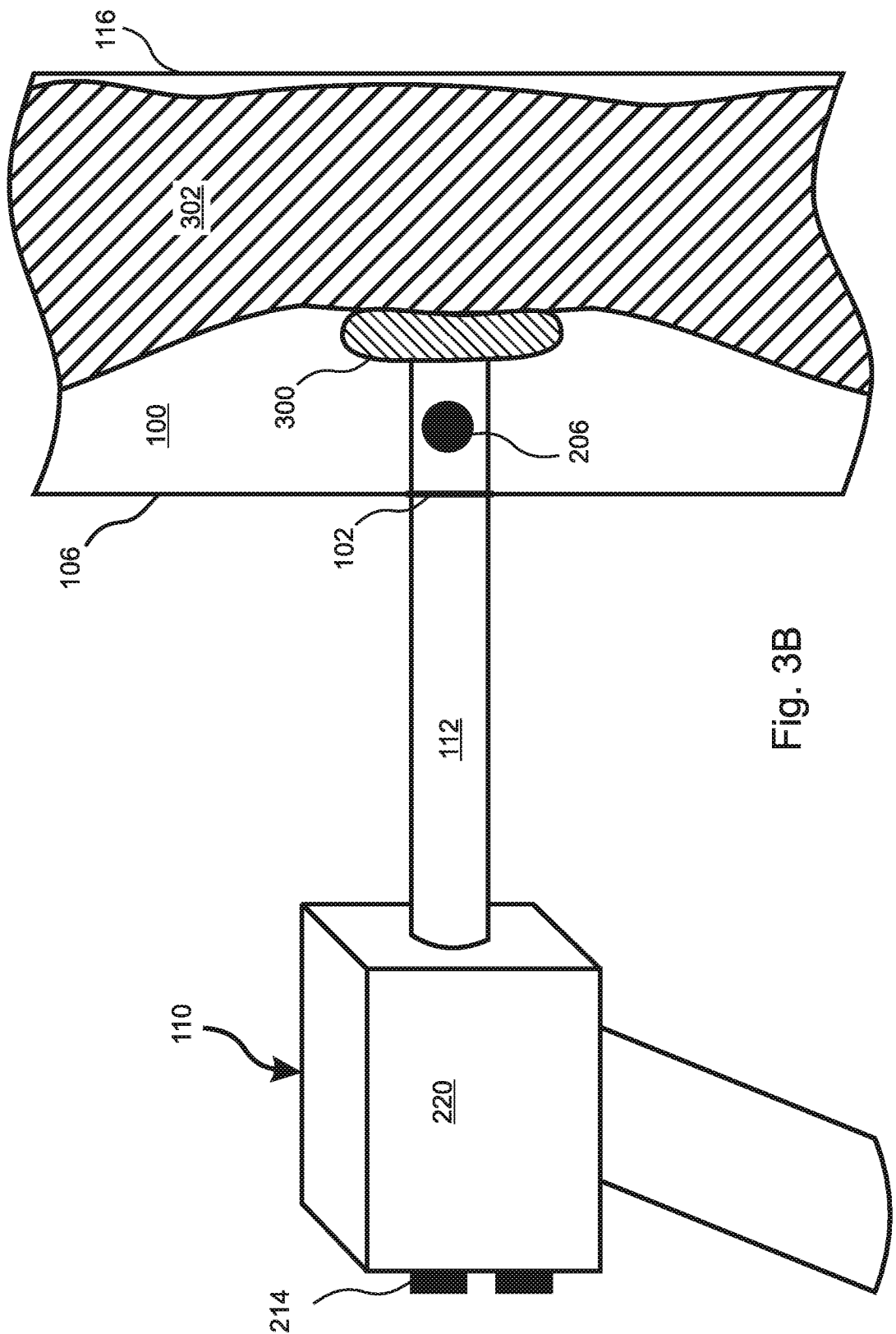
FIG. 3B illustrates the nozzle of FIG. 3A inserted within a wall cavity, whereby the deformable bulbous end has deformed against and compressed a layer of pre-existing insulation within the wall cavity, thereby creating a space proximal of the pre-existing insulation into which thermal insulation can be injected.

With reference to FIG. 3A, embodiments include a deformable "bulbous" end 400 attached to the distal end of the nozzle 112 that can be inserted through the panel hole 102 in an interior panel 106, and that will deform, as shown in FIG. 3B, as the nozzle is inserted into the cavity and the "bulbous" material 300 is pressed against pre-existing insulation 302 within the cavity 100 so that the pre-existing insulation material 302 is compressed forward, thereby creating space in front of the pre-existing insulation 302 into which the insulation material can be injected.

Figure 4C:
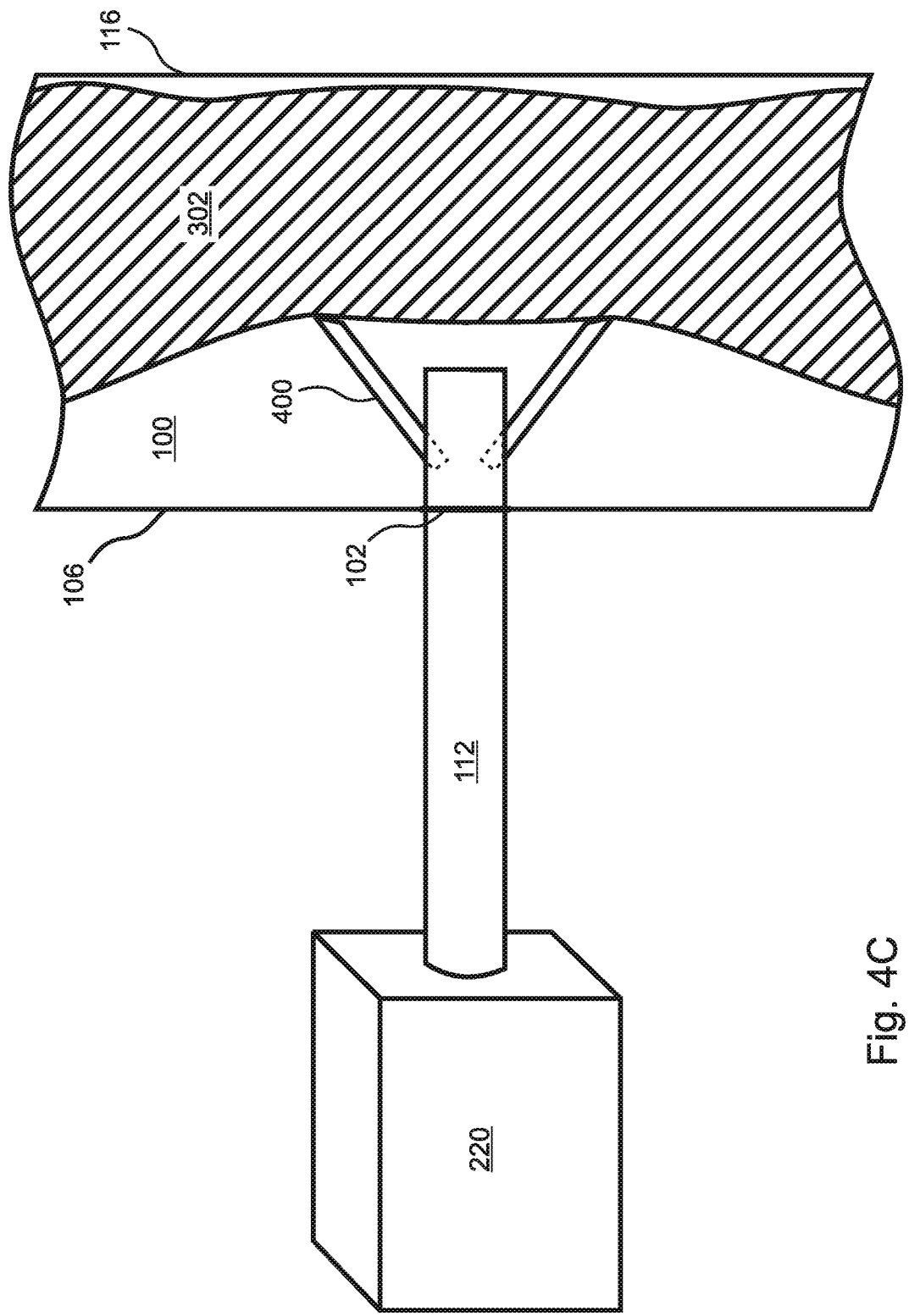
FIG. 4C illustrates the nozzle of FIG. 4B inserted within a wall cavity, where the expanded front facing wings have compressed a layer of pre-existing insulation within the wall cavity, thereby creating a space proximal of the pre-existing insulation into which thermal insulation can be injected.

Similarly, with reference to FIGS. 4A and 4B, for applications where it is desired to inject insulation materials within a cavity 100 on a proximal side of pre-existing insulation 302, i.e. without penetrating through the pre-existing insulation 302, embodiments include a nozzle 112 with front-facing expandable wings 400 that can be co-aligned with the nozzle 112 for insertion through a panel hole 102 in an interior panel 106, as shown in FIG. 4A, and then will expand radially outward from the nozzle 112, as shown in FIG. 4B, so as to push the pre-existing insulation 302 away from the interior panel 106, as shown in FIG. 4C, to create a space within which the insulating material can be deposited.

Figure 5:
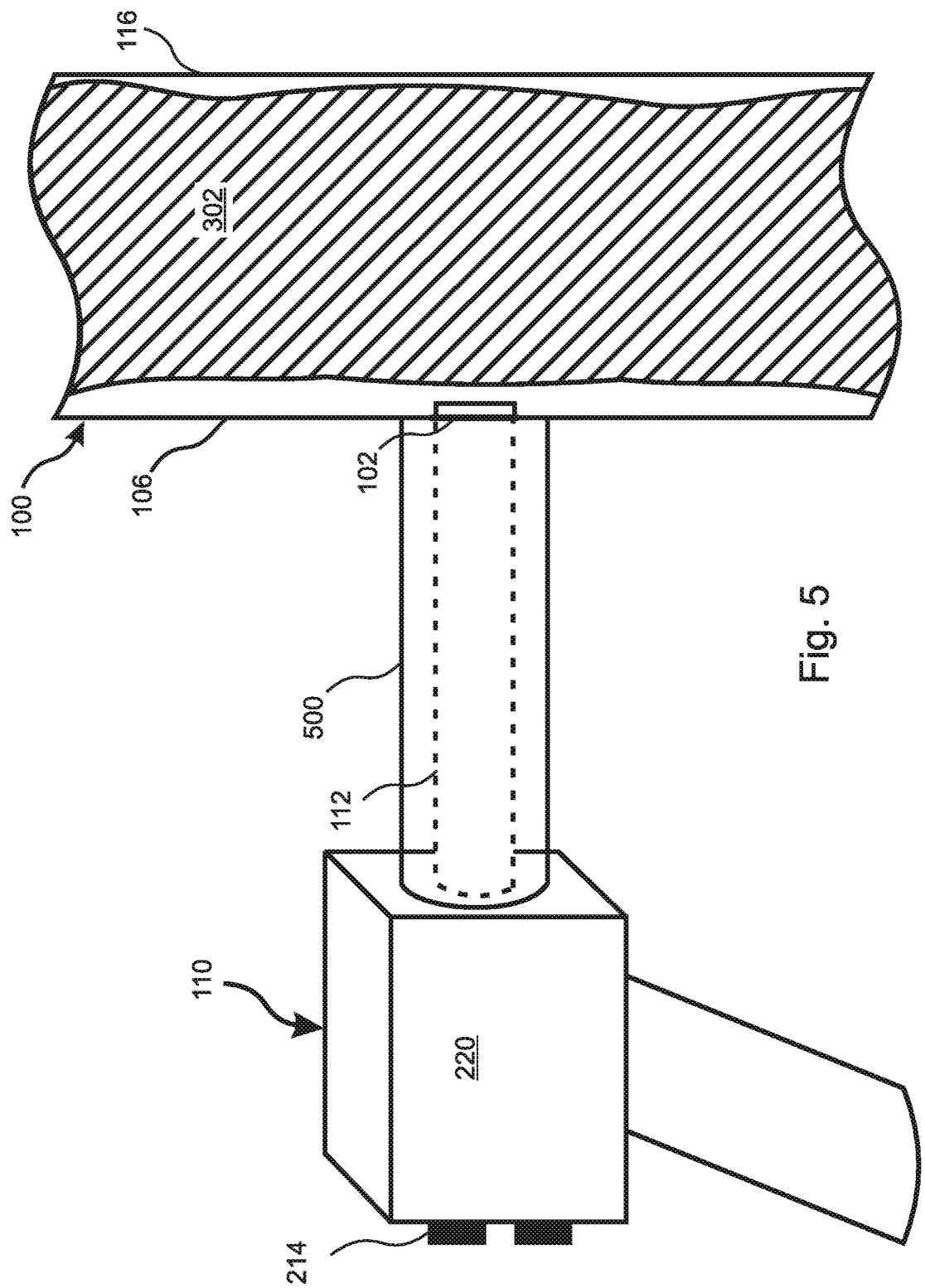
FIG. 5 illustrates a thermal insulation injection gun in an embodiment of the present invention wherein an offset collar is installed on the nozzle, thereby limiting and fixing the penetration depth of the nozzle so that it penetrates only slightly into the wall cavity.

With reference to FIG. 5, in other embodiments the insulation injection apparatus includes exchangeable offset collars 500 that can be installed on the nozzle 112, where the offset collars 500 are wider in diameter than the panel holes 102, and are of varying lengths. The operator is thereby able to select an offset collar 500 that will contact the outer surface of the interior panel 106 or exterior sheathing panel 116 when the nozzle 112 has reached a desired penetration depth within the cavity 100. For example, an offset collar 500 can be selected that contacts the outer surface of the interior panel 106 or exterior sheathing panel 116 just as the tip of the nozzle 112 enters the cavity 100, thereby ensuring that the insulating material is injected within the cavity 100 on the proximal side of the pre-existing insulation 302. Similarly, offset collars 500 can be provided that will position the tip of the injection nozzle 112 near to but slightly offset from the interior panel 106 or sheathing panel 116 of the cavity, thereby ensuring that the insulating material is injected proximal to the interior panel 106 or sheathing panel 116, while also ensuring that the distal end of the nozzle 112 is not blocked by being pressed against the interior panel 106 or sheathing panel 116.

Figure 6A:
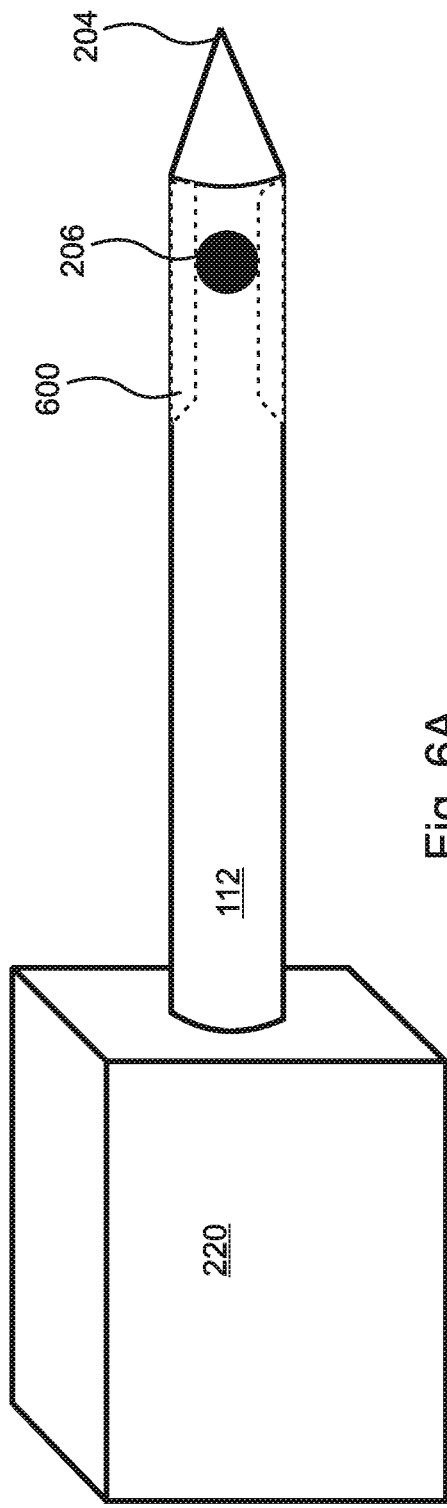
FIG. 6A illustrates a nozzle in an embodiment that includes rear facing expandable wings, where the expandable wings are shown in a folded configuration.
Figure 6B:
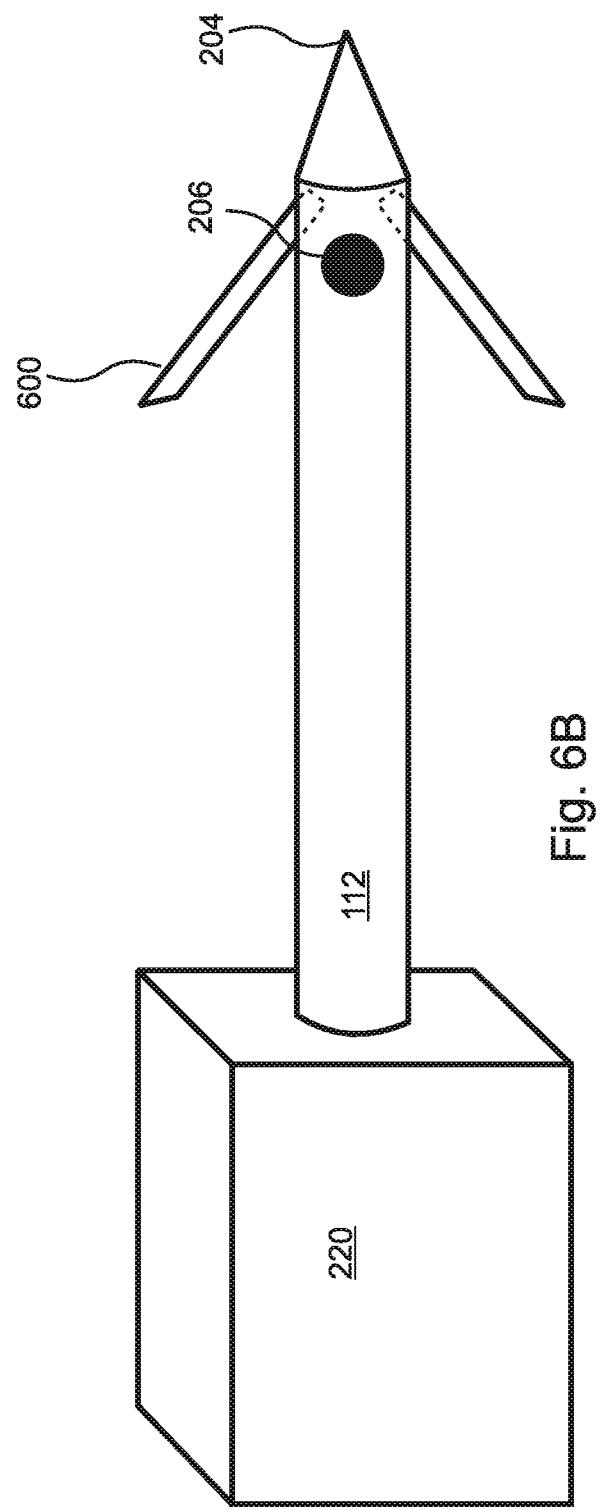
FIG. 6B illustrates the nozzle of FIG. 6A, where the rear facing expandable wings are shown in an expanded configuration.
Figure 6C:
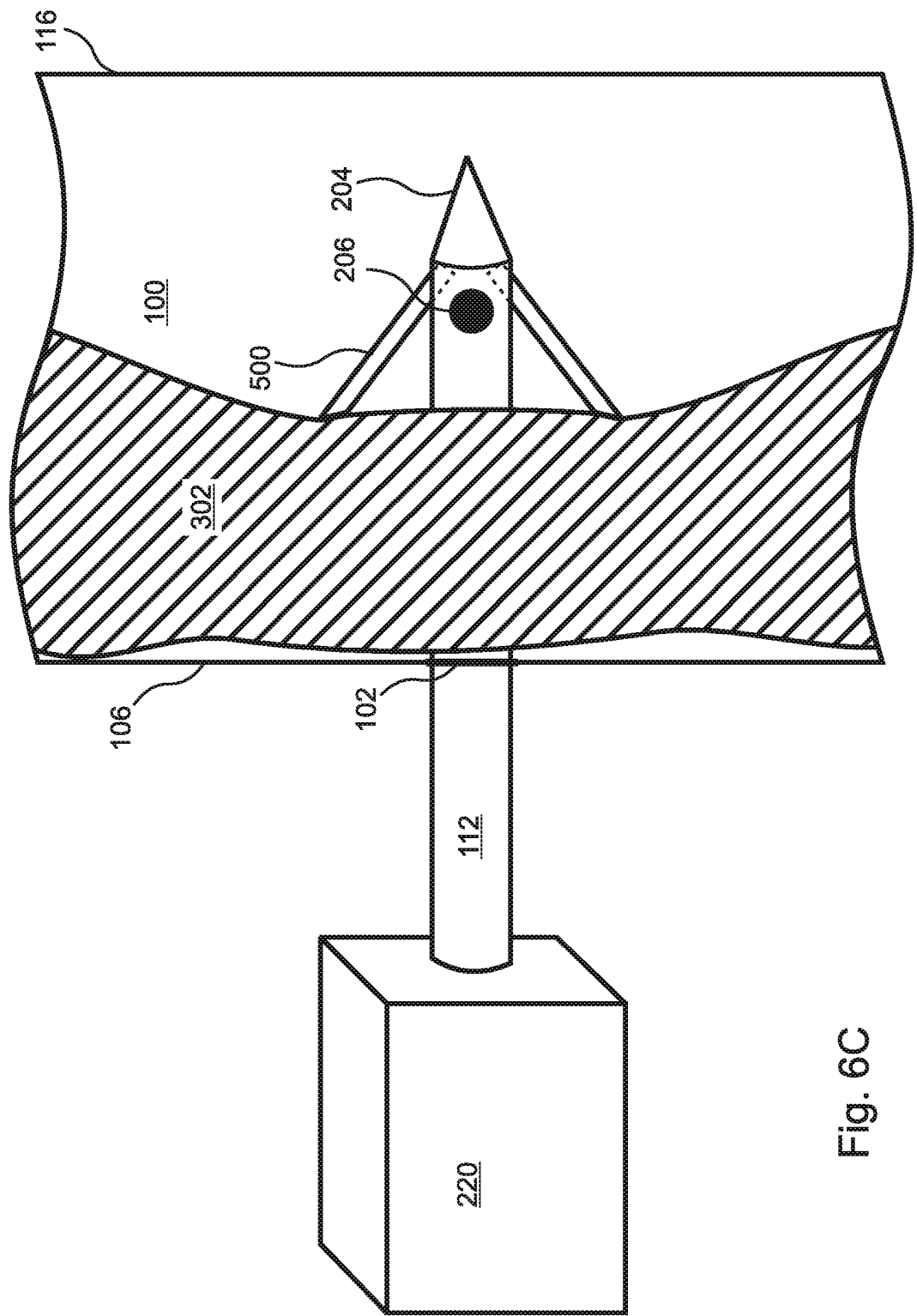
FIG. 6C illustrates the nozzle of FIG. 6B inserted within a wall cavity, where the expanded rear facing wings have compressed a layer of pre-existing insulation within the wall cavity, thereby creating a space distal of the pre-existing insulation into which thermal insulation can be injected.

With reference to FIGS. 6A through 6C, for applications where it is desirable to deposit insulation material on a distal side of pre-existing insulation 302, a distal tapered region 212 can be combined with rear-facing expandable wings 600 that will unfold after penetrating through the pre-existing insulation 302, and will pull and compress the pre-existing insulation 302 away from the distal interior panel 106 or sheathing panel 116 of the cavity 100 when the nozzle 112 is pulled slightly back from contact with the distal interior panel 106 or sheathing panel 116, thereby creating a space where the insulating material can be deposited proximal to the distal interior panel 106 or sheathing panel 116.

Figure 7:
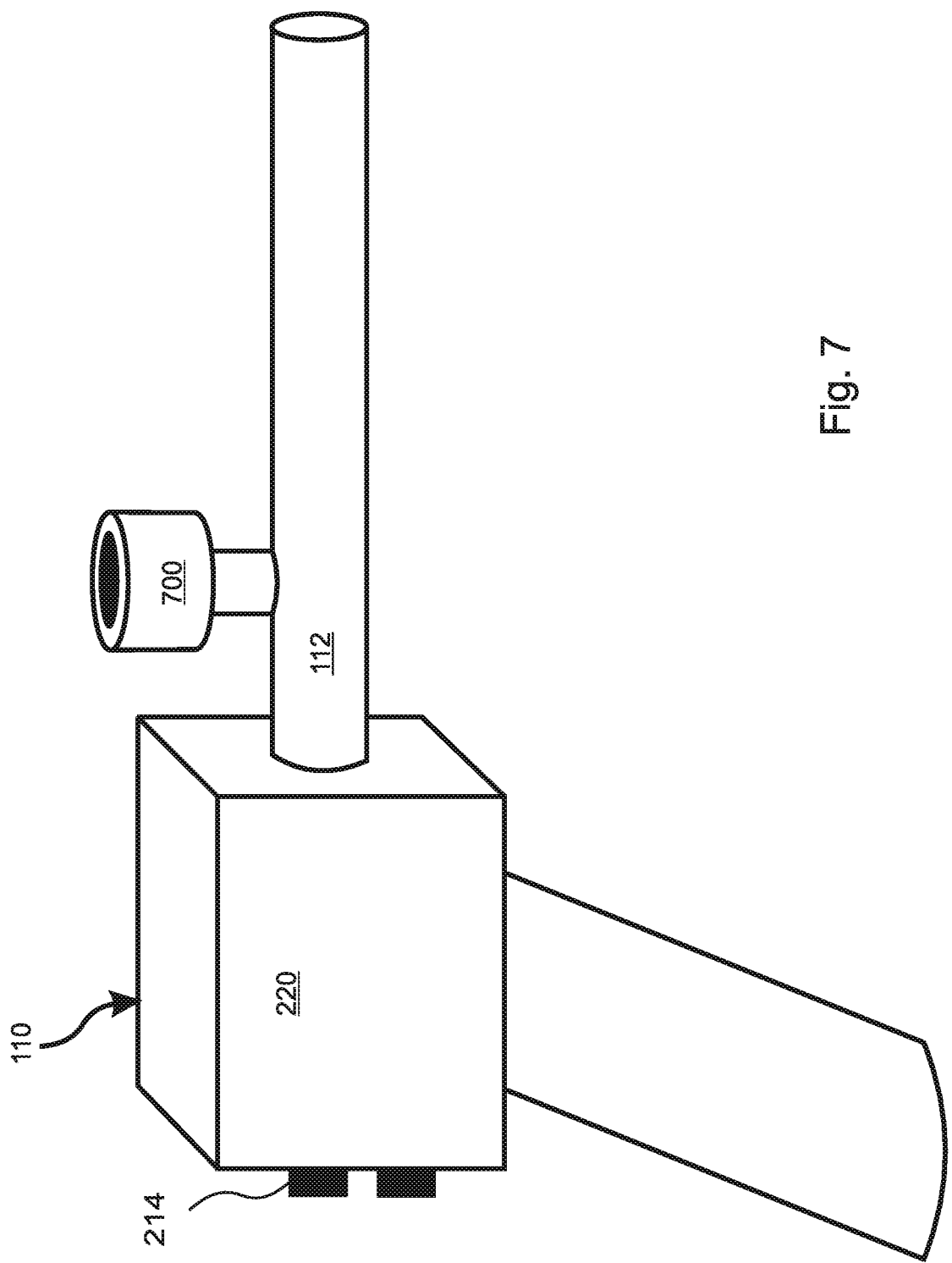
FIG. 7 is a perspective view of a thermal insulation injection gun in an embodiment of the present invention wherein the nozzle further includes an enhancement port.

With reference to FIG. 7, in embodiments the disclosed insulation injection device includes an additional input port 700, referred to herein as an "enhancement port" that is provided on the nozzle 112 and can receive an "enhancing" material to be mixed and injected with the insulating material into a cavity 100. The enhancement port 700 can significantly increase the variety of types of insulation that can be injected using the disclosed device. In various embodiments, and for various applications, the enhancement port 700 can be used for injecting a carrier gas into the stream of insulation material, injection of pre-expanded beads of foam and/or other insulation particulates, injection of fibrous insulation, injection of a binder, injection of a fire retardant, and/or injection of other gasses and/or liquids into the flow of insulation material.

For example, if two liquid precursors are being mixed immediately before they are injected into the cavity 100, the additional "enhancement" port 700 can be used to inject a carrier gas that will supply mixing energy to enhance the mixing of the two liquid precursors, thereby ensuring that the precursors are thoroughly mixed before they react.

In another example, the enhancement port 700 can be used to inject insulating particulates into a flow of one or more foam precursors, for example to reduce the effective expansion factor of a two-component pour foam. This approach can enable the particles to be coated by the liquid foam precursors as they are injected into the cavity, with the result that the liquid precursors then react within the cavity to form a binder that surrounds and suspends the particles. Similarly, if particles are being dispensed through the conventional hose or hoses 108 of the dispensing gun 110, then a foam precursor can be injected through the enhancement port 700 to coat the particles and form the suspending binder within the cavity.

Figure 8A:
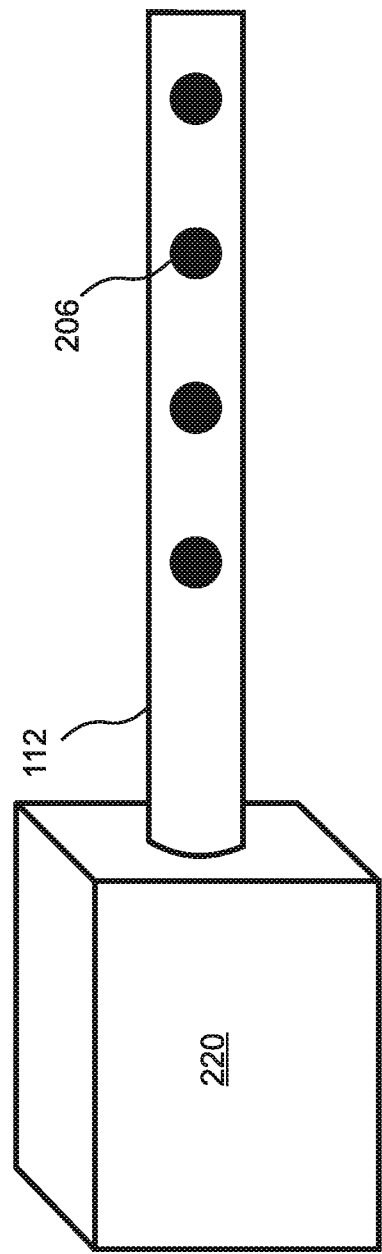
FIG. 8A illustrates a nozzle that includes a plurality of lateral dispensing ports.
Figure 8B:
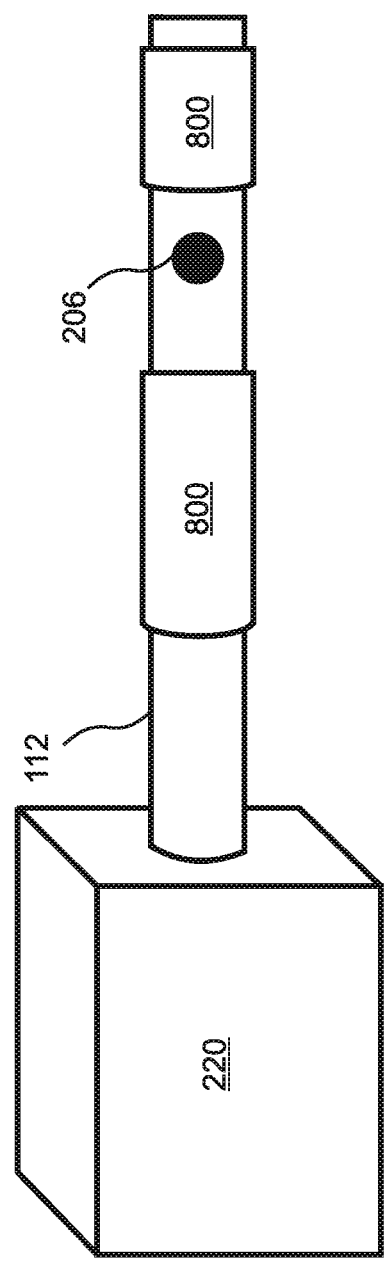
FIG. 8B illustrates the nozzle of FIG. 8A wherein all but one of the lateral dispensing ports are blocked by a pair of nozzle adapting collars installed on the nozzle.

With reference to FIGS. 8A and 8B, so as to enable the disclosed injection apparatus to inject insulating materials into a wider variety of cavity configurations without exchanging dispensing guns 110 or nozzles 112, in embodiments the injection nozzle 112 includes a plurality of lateral dispensing ports 206 at spaced-apart locations along the dispensing nozzle 112. According to these embodiments, a plurality of nozzle-adapting collars 800 are provided of differing lengths. As shown in FIG. 8B, the nozzle-adapting collars 800 fit closely around the nozzle 112, and can be used to cover all or a selected subset of the lateral dispensing ports 206, thereby allowing a single nozzle 112 to be adapted for dispensing insulation at differing combinations of depths and/or in differing directions according to the requirements of each cavity configuration.

Figure 9A:
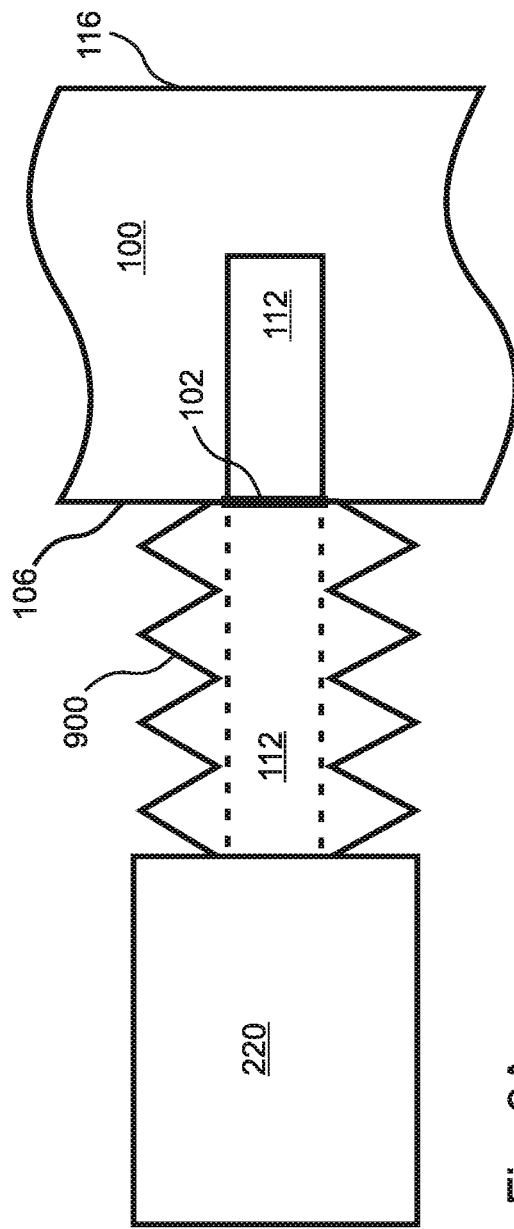
FIG. 9A illustrates a nozzle inserted into a wall cavity, wherein a compressed nozzle drip sheath surrounds the nozzle and forms a seal between the body of the injection gun and the wall cavity.
Figure 9B:
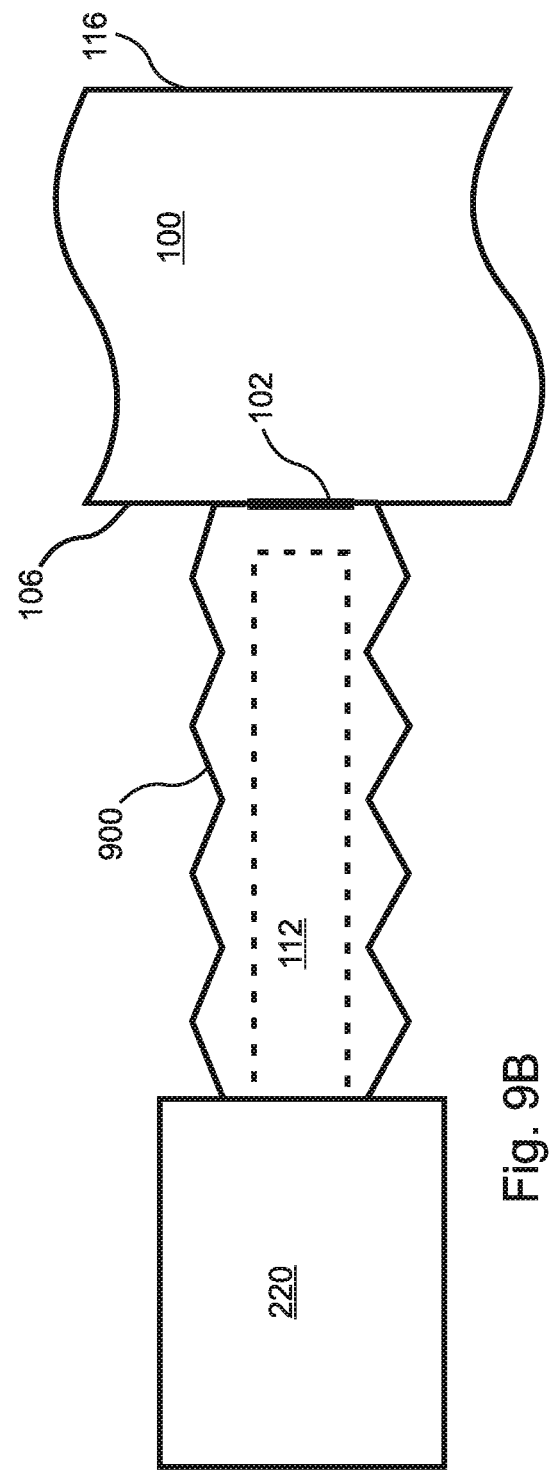
FIG. 9B illustrates the nozzle of FIG. 9A wherein the nozzle has been withdrawn from the wall cavity, while the expanded nozzle drip sheath continues to form the seal between the body of the injection gun and the wall cavity.

With reference to FIGS. 9A and 9B, various embodiments include an expandable "nozzle drip sheath" 900 that is configured to surround the nozzle 112 and to extend between the body 220 of the dispensing gun 110 and the outer surface of the interior panel 106 or exterior sheathing panel 116. As the nozzle 112 is inserted into the panel hole 102, as shown in FIG. 9A, the nozzle sheath 900 is compressed, and as the nozzle 112 is withdrawn from the panel hole 102, the nozzle sheath 900 re-expands, while maintaining a seal between the body 220 of the dispensing gun 110 and the interior panel 106 or exterior sheathing panel 116, thereby inhibiting any excess insulation material from inadvertently dripping out from the panel hole 102. In the case of foam-in-place insulation, it is only necessary to maintain the nozzle sheath 900 against the interior panel 106 or exterior sheathing panel 116 for a few seconds after an injection shot has been completed, after which any excess foam will have completed its expansion and will have hardened. In embodiments, the nozzle sheath 900 can include a spring that is surrounded by either a flexible bellows, as shown in FIGS. 9a and 9B, or by a layer of flexible material.

While much of the disclosure that is presented herein is directed to foam-in-place insulation, it should be understood that the term "precursor" is used generally herein to refer to any substance that can be injected through panel holes formed in a panel to fill a building cavity with insulation. Accordingly, unless otherwise required by context, the term "precursor" as used herein also includes insulating materials that do not undergo chemical reactions within a cavity, such as fibrous or granulate insulating materials that can be injected into a cavity. Furthermore, the term "precursors" is used generically herein to refer to precursors in the singular as well as in the plural, unless otherwise required by context. For example, a statement that "precursors" are injected into a cavity should be taken to refer also to instances and embodiments where a single precursor is injected, unless the context requires that more than one precursor is injected.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:
1. A thermal insulation injection device configured to inject a thermal insulation precursor into a building cavity, the thermal insulation injection device comprising:
  an input port provided in a body of the thermal insulation injection device, the input port being configured to receive an insulation precursor from a precursor supply vessel; and
  a nozzle extending from the body, the nozzle being configured for insertion into a building cavity through a panel hole provided in a proximal panel of the building cavity, and for injecting the insulation precursor into the building cavity;
  the nozzle being configured to direct the thermal insulation precursor from the input port through a central passage of the nozzle and out through at least one dispensing port of the nozzle into the building cavity;
  the nozzle being cylindrical and having a substantially uniform circular cross-sectional shape and area extending along a longitudinal axis over a central region thereof from a proximal end thereof to a distal tapered region thereof, the distal tapered region being formed as an intersection of the cylindrical central region with a plane that is oblique to the longitudinal axis, the distal tapered region being thereby shaped as an ellipse formed in the oblique plane and terminated at a distal tip that is substantially aligned with an outer wall of the nozzle, the distal tip having a cross-sectional area.

2. The injection device of claim 1, wherein at least one of the dispensing ports is provided in the distal tapered region of the nozzle.

3. The injection device of claim 1, wherein none of the dispensing ports is provided in the distal tapered region of the nozzle.

4. The injection device of claim 1, wherein at least one of the dispensing ports of the nozzle is provided in a side of the central region of the nozzle.

5. The injection device of claim 1, wherein when the distal tip is pressed against the proximal panel, the nozzle is able to penetrate through the proximal panel, thereby creating the panel hole.

6. The injection device of claim 1, wherein the injection device is configured to inject a foam-in-place precursor into the building cavity.

7. The injection device of claim 6, wherein the injection device is configured to inject a mixed plurality of foam-in-place precursors into the building cavity.

8. The injection device of claim 1, further comprising an enhancement port that is configured to receive an enhancing material for injecting thereof together with the insulation precursor into the building cavity.

9. The injection device of claim 8, wherein the enhancement port is provided in the central region of the nozzle.

10. The injection device of claim 8, wherein the enhancing material is one of a carrier fluid, a particulate insulating material, a fibrous insulating material, a binder, and a fire retardant.

11. The injection device of claim 1, further comprising expandable wings configured for co-alignment with the nozzle and insertion with the nozzle through the panel hole into the building cavity, the expandable wings being further configured to expand radially outward from the nozzle after insertion within the building cavity and to compress pre-existing insulation within the building cavity, thereby enlarging a space within with building cavity wherein the thermal insulation precursor can be deposited.

12. The injection device of claim 1, further comprising a compressible nozzle drip sheath that surrounds and is co-axial with the nozzle, the nozzle drip sheath having an expanded length that is greater than a length of the nozzle, the nozzle drip sheath having a diameter that is great than a diameter of the panel hole, the nozzle drip sheath being configured to extend between the body of the thermal insulation injection device and the proximal panel of the building cavity, and to be respectively compressed and expanded as the nozzle is inserted into and removed from the panel hole, the nozzle drip sheath thereby maintaining a seal between the body of the injection device and the proximal panel of the building cavity, such that any material that is discharged from the building cavity through the panel hole while the nozzle drip sheath is in contact with the proximal panel of the building cavity will be contained within the nozzle drip sheath.

13. The injection device of claim 12, wherein the nozzle drip sheath comprises a spring that is surrounded by at least one of a compressible bellows and a layer of a flexible material.

14. The injection device of claim 1, further comprising an exchangeable, incompressible offset collar that can coaxially surround the nozzle, the offset collar having a length that is less than a length of the nozzle, the offset collar having a diameter that is great than a diameter of the panel hole, the offset collar being configured to extend between the body and the proximal panel of the building cavity when the nozzle is inserted through the panel hole, the offset nozzle thereby limiting and determining a penetration depth of the nozzle into the cavity.

15. The injection device of claim 1, wherein a plurality of dispensing ports are provided along at least one side of the nozzle, and wherein the injection device further comprises a nozzle-adapting collar that is configured for surrounding coaxial installation onto the nozzle so as to cover and block at least one of the dispensing ports.

16. The injection device of claim 15, wherein the nozzle-adapting collar has an outer diameter that is smaller than a diameter of the panel hole, so that the nozzle-adapting collar is able to enter into the building cavity together with the nozzle.

17. A method of injecting thermal insulation into a building cavity, the method comprising:
providing a thermal injection device according to claim 1, wherein all of the dispensing ports are provided on at least one side of the central region of the nozzle in locations that position the dispensing ports proximal to the proximal panel when the distal tip of the nozzle is in contact with a distal panel of the building cavity;
inserting the nozzle into the building cavity through the panel hole until the distal tip of the nozzle contacts the distal panel of the building cavity; and
dispensing the thermal insulation through the dispensing ports, thereby injecting the thermal insulation into the building cavity proximal to the proximal panel.

18. A method of injecting thermal insulation into a building cavity, the method comprising:
providing a thermal injection device according to claim 1;
positioning the distal tip of the nozzle against a wall panel of the building cavity;
pressing nozzle against the wall panel, thereby causing the distal tip to penetrate into the wall panel;
continuing to press the nozzle against the wall panel, thereby forming the panel hole and causing the nozzle to enter into the building cavity;
dispensing the thermal insulation through the nozzle into the building cavity; and
withdrawing the nozzle from the panel hole.

\* \* \* \* \*